US010571635B1

(12) United States Patent
Leigh et al.

(10) Patent No.: US 10,571,635 B1
(45) Date of Patent: Feb. 25, 2020

(54) NESTED CO-BLINDMATE OPTICAL, LIQUID, AND ELECTRICAL CONNECTIONS IN A HIGH DENSITY SWITCH SYSTEM

(71) Applicant: Hewlett Packard Enterprise Development LP, Houston, TX (US)

(72) Inventors: Kevin B. Leigh, Houston, TX (US); Everett R. Salinas, Pasadena, CA (US); John Franz, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/121,984

(22) Filed: Sep. 5, 2018

(51) Int. Cl.
*G02B 6/38* (2006.01)
*G02B 6/35* (2006.01)
*H04Q 11/00* (2006.01)
*H01R 12/71* (2011.01)

(52) U.S. Cl.
CPC .......... *G02B 6/3897* (2013.01); *G02B 6/35* (2013.01); *H04Q 11/0005* (2013.01); *H01R 12/716* (2013.01); *H04Q 2011/0052* (2013.01)

(58) Field of Classification Search
None
See application file for complete search history.

(56) References Cited

U.S. PATENT DOCUMENTS

| 6,125,218 | A  | * | 9/2000  | Humphrey ........... G01F 23/161 250/577 |
| 7,738,757 | B1 |   | 6/2010  | Pakravan et al. |
| 8,015,458 | B2 |   | 9/2011  | Johnsen et al. |
| 9,462,720 | B1 |   | 10/2016 | Beck et al. |
| 2004/0000816 | A1 | * | 1/2004 | Khoshnood .......... G02B 6/3817 307/149 |
| 2008/0180903 | A1 | * | 7/2008 | Bisson ............... H05K 7/20563 361/679.49 |
| 2014/0002988 | A1 | * | 1/2014 | Roesner .................... G06F 1/20 361/679.49 |
| 2014/0108692 | A1 | * | 4/2014 | Doglio .................... G06F 1/183 710/300 |
| 2014/0369001 | A1 | * | 12/2014 | Miller .................. H05K 7/1425 361/694 |

(Continued)

OTHER PUBLICATIONS

ClusterDesign.org; "Fat-Tree Design"; printed on Jun. 14, 2018 from: http://clusterdesign.org/fat-trees/; 33 pages.

*Primary Examiner* — Tina M Wong
(74) *Attorney, Agent, or Firm* — Hewlett Packard Enterprise Patent Department

(57) ABSTRACT

Systems and methods are provided for a nested co-blindmate high-density optical switch system. The nested co-blindmate high-density optical switch system can include a system enclosure, and an enclosure midplane that is installed the system enclosure. Further, a switch chassis can be enclosed by the system enclosure, and liquid blindmate to a liquid line on a rack; optically blindmate to at least one blade in the system enclosure; and electrically blindmate to the enclosure midplane. At least one optical switch line-card can be included in the system, which is enclosed by the switch chassis, and further enclosed by the system enclosure in a nested manner. The at least one optical switch line-cards can liquid blindmate to the switch chassis, optically blindmate to the switch chassis, and electrically blindmate to the enclosure midplane.

9 Claims, 14 Drawing Sheets

(56) References Cited

U.S. PATENT DOCUMENTS

| | | | |
|---|---|---|---|
| 2015/0098173 A1* | 4/2015 | Leigh | H05K 7/1487 361/679.5 |
| 2016/0150681 A1* | 5/2016 | Leigh | H05K 7/1492 361/679.46 |
| 2017/0257970 A1 | 9/2017 | Alleman et al. | |

* cited by examiner

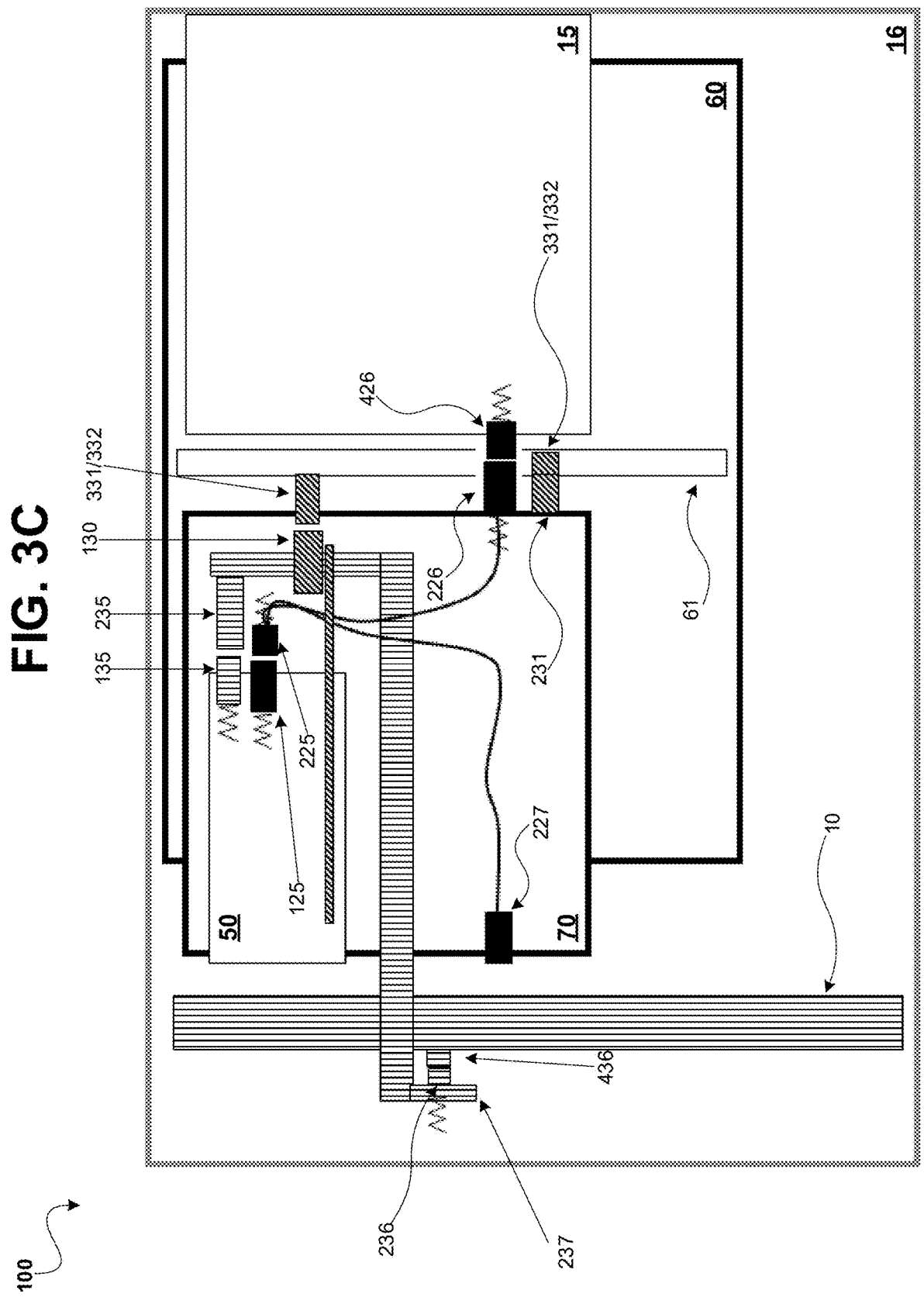

NESTED CO-BLINDMATE OPTICAL, LIQUID, AND ELECTRICAL CONNECTIONS IN A HIGH DENSITY SWITCH SYSTEM

DESCRIPTION OF RELATED ART

Optical data systems or more generally, optical communication systems including, but not limited to, those used in large data centers, often must accommodate large amounts of data using a finite number of optical interconnects. In some optical communications systems, optical fibers are used to interconnect system elements. Increasing the amount of data handled by the optical communications system may lead to a demand for optical fiber interconnects that exceeds the available number of optical fibers in the existing optical communications system. In many cases, more optical fibers are added to accommodate the demand, thereby creating a high-density connectivity having the large number of optical fibers.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 3A-3D are diagrams of an example mating sequence for the nested co-blind mated liquid, optical, and electrical connectors of the high-density optical switch system, shown in FIG. 2, according to some embodiments.

Figure 1:
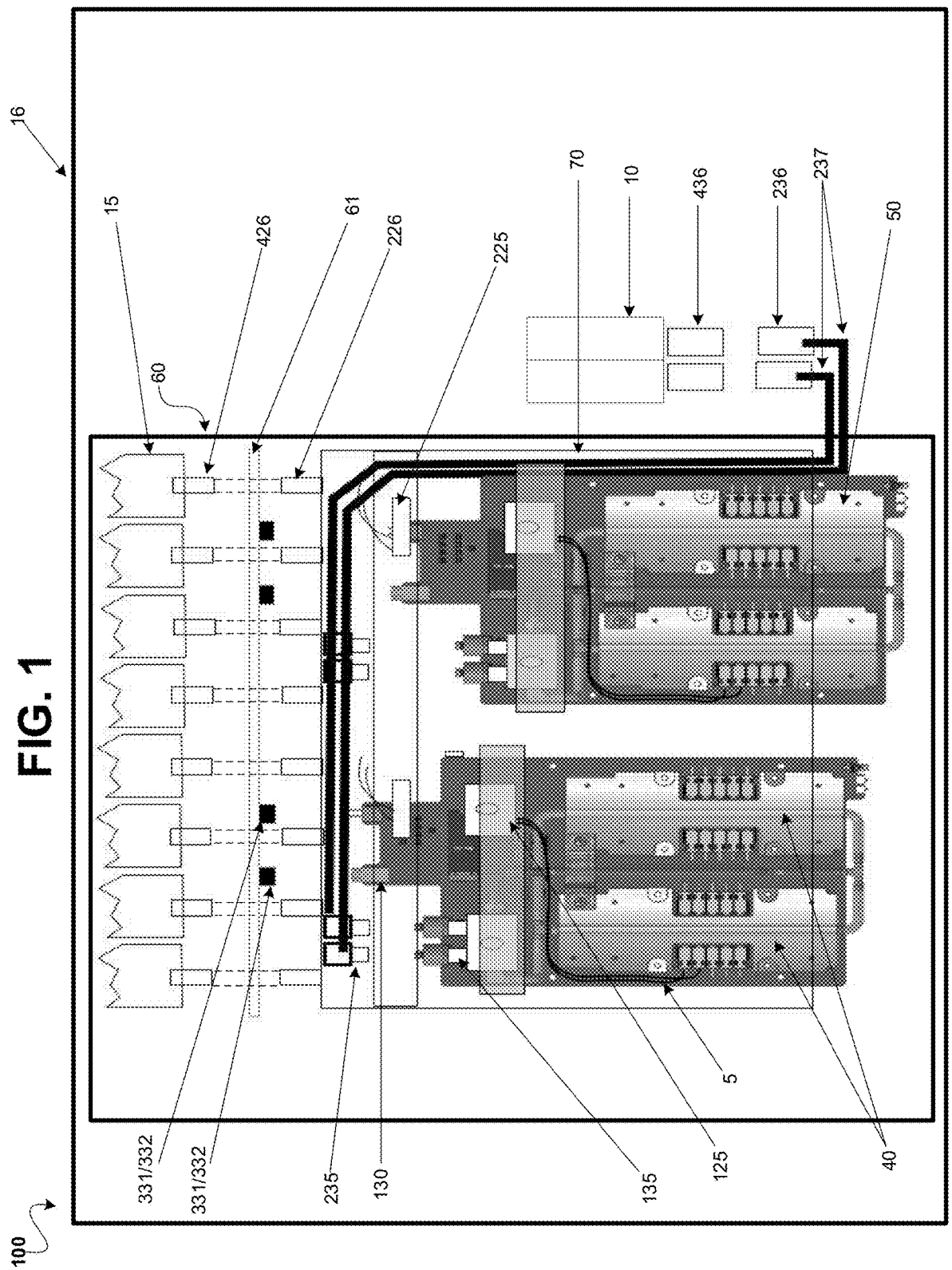
FIG. 1 is a diagram of an example high-density optical switch system, including nested co-blind mating liquid, optical, and electrical connectors, according to some embodiments.

The figures are not exhaustive and do not limit the present disclosure to the precise form disclosed.

DETAILED DESCRIPTION

Various embodiments described herein are directed to an optical switch system having a nested co-blindmated configuration of the components therein. For purposes of discussion, the various systems and techniques of the disclosed embodiments may be referred to as a nested co-blindmate high-density optical switch system. The nested co-blind mate optical switch system is designed to provide reliable optical, liquid, and electrical couplings between the components therein. Accordingly, the nested co-blindmate high-density optical switch system incorporates liquid co-blindmate connectors that allow for adequate cooling of the high-density components. Even further, the nested co-blind mate optical switch system provides optical and electrical co-blindmate connectors, allowing the switch to leverage that optical and electrical components deemed necessary to be optimized for emerging technologies, such as high-performance systems (e.g., connected with low-latency, high-bandwidth fabrics). The nested co-blindmate high-density optical switch system has a "nested" configuration. The "nested" configuration can be generally described as including multiple assembly layers of the nested co-blind mate optical switch system, where each assembly layer has respective components and various connectors that are designed to allow for assembling the layers in a manner that supports co-blindmating of these connectors. Additionally, some components of the nested co-blindmate high-density optical switch system are designed to have float (e.g., flexible movement), in order to support ease and reliably of co-blindmating the connectors of the multiple assembly layer during assembly. For purposes of discussion, "nested" can be described as a structure, having generally smaller physical dimensions of a larger structure, that can be enclosed, at least in part, inside of the larger structure. As an example, a system is said to be nested when an enclosure has a sub-enclosure. The term "co-blindmate" as disclosed herein describes blindmate events in sequence involving multiple types of connectors of a module being coupled to a stationary set of corresponding connectors without the connectors being visible to a human operator.

Emerging data-intensive applications may increase the demand for high-performance systems and large-capacity memory that can be efficiently connected with low-latency high-bandwidth fabrics. For example, some High Performance Computing (HPC) systems and Memory-Driven Computing (MDC) systems can have an overarching architecture that may drive the desire for the industry to realize high-performance systems and fabrics to address new market needs. Some current approaches employ interconnecting multiple high-radix optical switch systems to build large compute and memory fabrics. High-performance may be achieved using this approach of interconnecting multiple high-radix, and other similar, optical switch systems. Nonetheless, design trade-offs involving large switches, complex cabling, and difficulties in deployment and servicing may be experienced. Accordingly, some emerging high-radix switch chips (e.g., 50 Gbps/channel and above) may require an optical interface that is in close physical proximity to the switching logic. Although fiber optical-based solutions may become dominant in the area of high-performance systems, the use of electrical connectivity may remain desirable in some capacities. For example, high-performance system may continue to utilize electrical connection for electrical power and system management signals. Thus, as trends in high-performance systems continue to advance, a shift away from electro-mechanical designs, and towards electro-optical-mechanical designed systems that more seamlessly integrate optical connectivity solutions may arise.

Moreover, some optically co-packaged application-specific integrated circuits (ASICs) can provide the benefit of enabling switch chips to be denser (e.g., by mitigating the requirement for electrical high-speed signal pins to be routed on system boards). However, these switch chips may experience such high thermal density, that air-cooled system may be impractical (e.g., cooling efficiency, costs). In many instances, liquid cooling techniques may present a more efficient cooling solution in comparison to air cooling. Accordingly, it may be desirable to integrate liquid cooling components in high-performance systems.

The nested co-blind mate optical switch system is implemented using an electro-optical-mechanical design that is operable in a compute blade/rack environment. Restated, the nested co-blind mate optical switch system integrates electrical components, optical components, and mechanical components, as deemed suitable implement a switch system that is optimized for the emergence of high-performance systems, as alluded to above. Furthermore, the nested co-blindmate high-density optical switch system can mitigate draw-backs of existing high-performance systems, by providing various solutions, including: providing cooling of the high-power density switches; providing optical connectivity of scalable (e.g., small-to-large) optical fabric topologies; and a configuration that lends itself to an efficiently packaged system (e.g., improving power, performance, cost, and usage). Thus, the nested co-blind mate optical switch system realizes improvements over some currently used high-performance systems.

FIG. 1 is a diagram of an example nested co-blindmate high-density optical switch system 100, in accordance with the embodiments. Although the system 100 is described as an optical switch system for purposes of discussion, it should be appreciated that the system 100 is not limited to the embodiment of an optical switch system. For example, the system 100 can be implemented as a system of electrical switches, as opposed to optical switches, having optical interfaces off the electrical switches. The nested co-blindmate high-density optical switch system 100 can generally be described as having the functionality of a network switch, facilitating the flow of incoming data being received (at an input port) from a network device and forwarded (from an output port) to a destination network device connected thereto, thereby supporting network connectivity. In some cases, the nested co-blindmate high-density optical switch system 100 can be a core switch, serving as the backbone of a network in high-density environments such as campus-aggregation and data-center networks, and capable of various functions, including, but not limited to: connecting either aggregation or edge switches to each other; connecting user or device edge networks to data center networks; and connecting enterprise local area networks (LANs) to the routers that connect them to the Internet. Moreover, the nested co-blindmate high-density optical switch system 100 is configured to operate in accordance with emerging data-intensive technology, as alluded to above. Accordingly, the nested co-blindmate high-density optical switch system 100 disclosed herein, is capable of high performance and density, low latency, scalability, and power efficiency.

According to the embodiments, the nested co-blindmate high-density optical switch system 100 employs optical switching technology. As seen in FIG. 1, the nested co-blindmate high-density optical switch system 100 can include multiple optical switches 40. In an example computer networking environment, the optical switches 40 can drive the functionality of the system 100, being used to send and receive data transmissions as well as to determine the destination and/or routing for data, much like a common networking switch. Employing optical switches 40 provides multiple advantages related to high-speed and high-bandwidth. Moreover, reliability of the nested co-blindmate high-density optical switch system 100 can be enhanced, since signals transmitted via optical fibers 5, in most cases are not affected by interference from electromagnetic waves (eliminating the effect of noise in fiber optic technology). According to the embodiments, the nested co-blindmate high-density optical switch system 100 provides optical connectivity, via the optical switches 40, in manner that provides scalable optical fabric topologies.

FIG. 1 illustrates that the hardware configuration of the nested co-blindmate high-density optical switch system 100 can be a modular system. As a general description, the top and bottom parts of FIG. 1 represent the front and the rear of the enclosure, respectively. For purposes of illustration, the rear portions of blades 15 (discussed in greater detail below) are shown partially where an enclosure midplane 61 position may be substantially near the rear of the system enclosure 60.

A first level of modularity involves the rack 16. The rack 16 is shown as a large hardware structure serving as a primary physical housing, or cabinet frame, for the nested co-blindmate high-density optical switch system 100. As seen in FIG. 1, the hardware equipment of the system 100 can be installed inside of (or mounted thereto) rack 16. For purposes of illustration, the rack 16 is described as a primary housing, in reference to it being the structure in which most of the other modules and/or components of the nested co-blindmate high-density optical switch system 100 are enclosed. In some cases, the rack 16 has multiple regions, or a specific area of the rack 16 where the various modules of rack-mountable equipment can be attached. In some cases, the remaining modules of the nested co-blindmate high-density optical switch system 100 can occupy one or more regions of the rack 16. In some cases, other subsystems and equipment may be mounted to the rack 16 (e.g., not inside of enclosure 60), such as rack liquid lines 10, which can be part of a cooling system employed by the system 100.

Another layer of modularity can involve a system enclosure 60. The system enclosure 60 is shown in FIG. 1 as a smaller housing structure (in comparison to the rack 16) that can be mounted to, and enclosed by rack 16. In some cases, the system enclosure 60 can occupy one or more regions of the rack 16. The system enclosure 60 can be designed with further modularity, providing structural support for smaller modules and/or subsystems to be installed therein. In detail, the system enclosure 60 can be the largest module, or assembly layer, of the components involved in the "nesting" aspect of the nested co-blindmate high-density optical switch system 100 described herein. As a general description, the "nested" modules of the nested co-blindmate high-density optical switch system 100 include optical switch line-cards 50, that are nested inside of a switch chassis 70, which are further nested inside of the system enclosure 60. Additionally, the optical switch 40 described above can be generally described as a modular assembly, constructed by inserting an optical switch line-card 50 into a switch chassis 70. Additional details regarding the nested assemblies of the nested co-blindmate high-density optical switch system 100, involving the co-blindmating of the various blindmate connectors, including: switch line-card liquid blindmate connectors 135; switch line-card optical blindmate connectors 125; switch line-card electrical blindmate connectors 130; switch chassis optical blindmate connectors 225 (to switch line-card 50), 226 (to blades 15); switch chassis liquid blindmate connectors 235 (to switch line-card 50), 236 (to rack liquid lines 10); enclosure midplane electrical blindmate connectors (power) 331, (management) 332; and blade optical blindmate connectors 426 are described below.

In FIG. 1, the nested co-blindmate high-density optical switch system 100 can include multiple blades 15. Blades 15 can consist of high-density processors providing the computing power for the data center, for example. As an example, a blade 15 can include two independent compute nodes in one mechanical package, in order to maximize computing capacity. Blades 15 can be installed in the front of the system enclosure 60, as shown in FIG. 1 within mounting structures, such as front bays separated by divider rails. The front bays are substantially deeper in dimension compared to the rear bays, since the blades 15 need to support high-performance computing components, memory components and fabric interface components. In practice, bays can be used in the system enclosure 60 when switch chasses 70 are to be installed. Other types of modules may be installed instead of switch chassis 70 for different configurations, which is beyond the scope of this disclosure. The front bays' and rear bays' depths in combination cannot be beyond the depth of the system enclosure 60, which is in turn limited by the depth of the rack 16. Consequently, switch components need to have high density and electrical, power and liquid cooling connections for switches need to be accomplished in relatively tight spaces, while allowing multiple optical switches 40 to be independently and modularly serviceable to enable maximum enclosure service uptime.

By residing in the same system enclosure 60, blades 15 can share common enclosure resources, such as power and cooling. In some embodiments, the system enclosure 60 includes front bays for receiving the blades 15, allowing the system enclosure 60 to have blade expansion capabilities (e.g., having two 4-bay blades, or four 2-bay blades in an 8-bay enclosure). In a mating sequence during assembling the nested co-blindmate high-density optical switch system 100, the blades 15 can be blindmated at the front of the system enclosure 60. In some cases, the blades 15 are optically blindmated to the system enclosure 60. At a subsequent point in the mating sequence, for instance after the switch chassis 70 is installed at the rear of the system enclosure 70, the blades 15 can be over-driven. Over-driving can cause the blades 15 to provide positive reactive force, creating a stable and reliable physical coupling to the system enclosure 60, and electro-optical coupling to the nested modules of the nested co-blindmate high-density optical switch system 100.

FIG. 1 also shows an enclosure midplane 61, which provides holes (illustrated by the dashed lines through enclosure midplane 61) for the blades 15 installed at the front of the system enclosure 60, and the optical switches 40 installed at the rear of the system enclosure 60 to directly couple. In some cases, the enclosure midplane 61 supports midplane electrical power and management signal connectors 331,332 where power is routed from power supply modules in the enclosure (not shown) to blades 15 and switch line-cards 50. Furthermore, the midplane electrical power and management signal connectors 331,332 can support signals to and from an enclosure manager (not shown) that are coupled to blades 15 and switch line-cards 50, for monitoring and controlling the nested co-blindmate high-density optical switch system 100. FIG. 1 shows that the enclosure midplane 61 can be located substantially near the rear of the system enclosure 60. In this arrangement, the enclosure midplane 61 can also form the rear for a switch line-card cage (shown in FIG. 5B) upon installation. Other equipment and subsystems of the nested co-blindmate high-density optical switch system 100 can also be installed into the enclosure 60. For example, power supplies and enclosure manager components may also connect to the enclosure midplane 61 in some embodiments.

FIG. 1 illustrates that the nested co-blindmate high-density optical switch system 100 is configured such that a switch chassis 70 can be co-blindmated using switch chassis liquid blindmate connectors 235 (to switch line-cards 50), 236 (to rack liquid lines 10) and switch chassis optical blindmate connectors 225 (to switch line-cards 50), 226 (to blades 15) mounted thereto. Consequently, the switch chassis 70 has a unique configuration, enabling the nested co-blindmate high-density optical switch system 100 to provide the high-density benefits of optical connectivity, and the efficient cooling benefits of liquid cooling system within the same system enclosure 60.

As a general description, the switch chassis 70 can be a rigid structure that can be a protective and mountable housing for the components of the optical switches 40 disposed on switch line-cards 50. For instance, the switch chassis 70 can be constructed of sheet-metal, serving to enclose switch line-cards 50 holding optically co-packaged switch application-specific integrated circuits (ASICs) 40 (shown in FIG. 5A) installed therein. As an example, a switch chassis 70 used in the system 100 can have the dimensions of approximately 17 inches in width, approximately 14 inches in depth, and approximately 6 inches in height. In the example illustrated in FIG. 1, the switch chassis 70 houses four optical switch line-cards 50 (where only the top two line-cards are visible), and two 64-port optical switch chips 40 per line-card 50. Moreover, in developing optical connectivity techniques, multiple signal wavelengths can be supported on each optical fiber pair 5 (e.g., combining transmit signal 4-wavelength sets on a fiber and receive signal 4-wavelength sets on another fiber) representing a 4-lane port. Thus, high bandwidth can be realized, while minimizing the fiber count egressing an ASIC package as opposed to one wavelength per fiber which will require 8 fibers for four transmit channels and four receive channels of a 4-lane port. In accordance with these developing optical connectivity techniques, the switch chassis 70 in the previous example can implement 512 ports (e.g., four transmit/receive channels per port). Each switch line-card 50 may consume higher than 1200 W of power and therefore a switch chassis 70 needs to be able to extract heat associated with 5000 W of power that in turns require liquid cooling of the optical switches 40.

The switch chassis 70 is described as a component that is configured in accordance with the nested aspects described herein. That is, the switch chassis 70 is a part of a modular assembly, where the optical switch line-cards 50 can be installed in the switch chassis 70. In turn, the switch chassis 70 can be installed in a rear bay of the system enclosure 60, as alluded to above. Moreover, the switch chassis 70 is designed to include switch chassis liquid blindmate connectors 235 (to liquid couple to switch line-card 50); switch chassis liquid blindmate connectors 236 (to liquid couple to rack liquid lines 10); switch chassis optical blindmate connectors 225 (to optically couple to switch line-card 50); and switch chassis optical blindmate connectors 226 (to optically couple to blades 16). Accordingly, assembling the nested co-blindmate high-density optical switch system 100 can involve a first stage of liquid blindmating the switch chassis 70 to the rack 16. For instance, switch chassis liquid blindmate connectors 236, which are attached to switch chassis liquid lines 237, can be coupled to the liquid connectors 436 on the rack liquid lines 10. In some cases, prior to the first stage, the blades 16 have been installed in the front portion of the system enclosure 60. Furthermore, a second stage can include optically blindmating the switch chassis 70 to the blades 15 through the holes on the enclosure midplane 61. As example, the switch chassis optical blindmate connectors 226 of the switch chassis 70 are correspondingly coupled to the complementary blade optical blindmate connectors 426 of the blades 15 through the midplane 61 (illustrated by dashed lines through enclosure midplane 61), which facilitates the optical interconnection. In some embodiments, the blades 15 can optically blindmate to the switch chassis 70 after securely installing the switch chassis 70 into the system enclosure 60.

In continuing with the example of assembling the nested co-blindmate high-density optical switch system 100, the sequence can proceed to additional stages involving the optical switch line-card 50. A third stage can include liquid blindmating the switch line-card 50 to the switch chassis 70. A fourth stage can include further coupling to the switch chassis 70, where the optical switch line-card 50 is optically blindmated to the switch chassis 70. A fifth stage can include electrically blindmating the switch line-card 50 to the enclosure midplane 61. Thus, the nested co-blindmate high-density optical switch system 100 thereby supporting the electro-optical-mechanical design of the system 100, as alluded to above.

Also, the nested co-blindmate high-density optical switch system 100 can include multiple optical switch line-cards 50, as seen in FIG. 1. Optical switch line-cards 50 can provide interfaces to the network. For instance, an optical switch line-card 50 terminates network traffic that is being received over an optical fiber interface. In the nested co-blindmate high-density optical switch system 100, optical switch line-cards have a unique configuration, which integrates connections for liquid, optical, and electrical co-blindmating.

Figure 2:
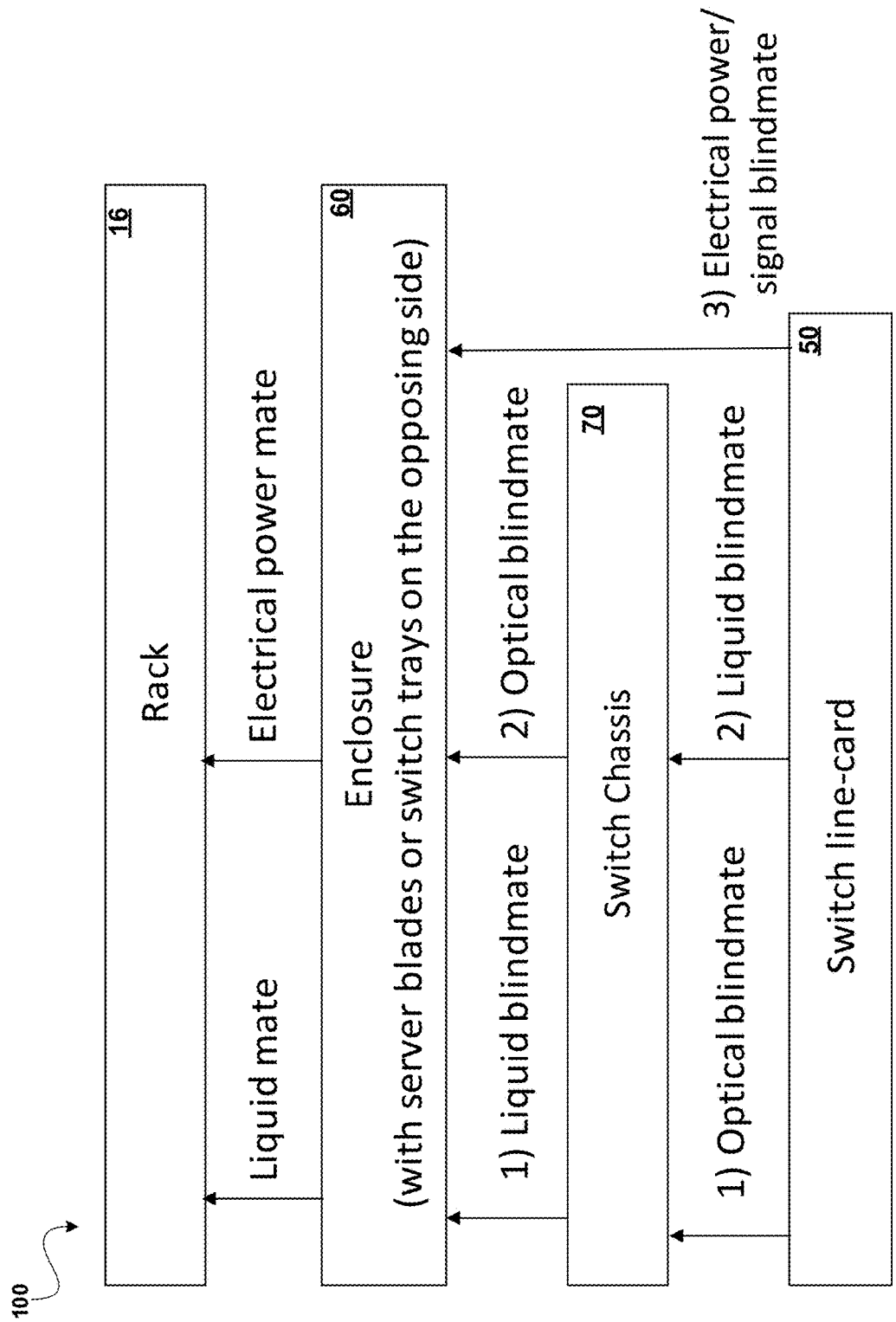
FIG. 2 is a block diagram of the example high-density optical switch system shown in FIG. 1, according to some embodiments.

FIG. 2 is a block diagram of the example nested co-blindmate high-density optical switch system shown in FIG. 1. FIG. 2 serves to illustrate a conceptual overview of the blindmating sequence for the nested co-blindmate high-density optical switch system. Each of the blocks in FIG. 2 can be described as representing a modular component of the nested co-blindmate high-density optical switch system 100, as described in detail above in reference to FIG. 1. Also, the blocks are arranged to represent a hierarchical order relating to the varying levels of modularity in the co-blindmate high-density optical switch system 100. The blocks are arranged in an ascending order (e.g., starting from the switch line-card 50 up) reflecting the increasing size of each module. For example, the switch line-card 50 is the smallest module 50, the switch chassis 70 is comparatively larger, enabling the switch line-card 50 to be stably nested inside the switch chassis 70. Next, the system enclosure 60 is the successively larger module, allowing the switch chassis 70 (including the switch line-card 50) to be nested therein. Lastly, the rack 16, can be considered the largest module of the system 100, encompassing each of the other components, the enclosure 60, the switch chassis 70, and the switch line-card 50.

Also, FIG. 2 illustrates the blindmating associated with each module, or assembly layer. It should be appreciated that FIG. 2 is described in an order of modularity, rather than in an order relating to the sequence of mating (discussed in further detail in reference to FIGS. 3A-3D). As seen in FIG. 2, the switch line-card 50 liquid blindmates to the switch chassis 70, and further optically blindmates to the switch chassis 70. Also, the switch line-card 50 electrically blindmates to system enclosure midplane (not shown), eventually to be installed inside of the system enclosure 60, as a result of being nested inside of the switch chassis 70. In some cases, electrical power, and electrical management signals are facilitated using this electrical coupling to the enclosure midplane (not shown) within the system enclosure 60, as alluded to above. As illustrated, the switch chassis 70 optically blindmates, in order to be nested inside of system enclosure 60. Further, the system enclosure 60 have liquid and power connection to be nested inside of the largest module, namely the rack 16. There are other electrical coupling between the system enclosure 60 and the rack 16, e.g., power supplies, enclosure management signals, etc., according to industry standard practices that are beyond the scope of this disclosure.

Figure 3A:
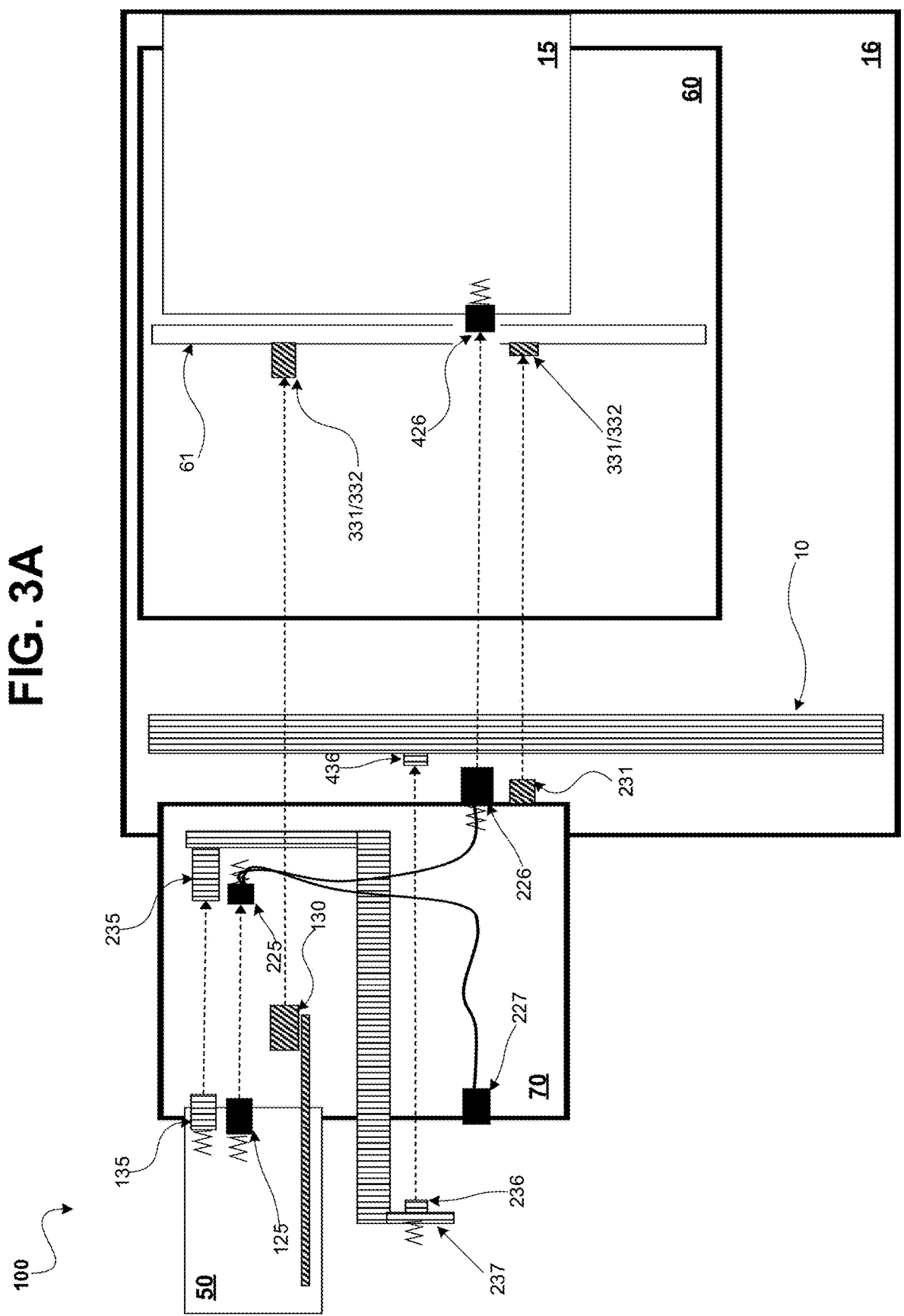
Figure 3B:
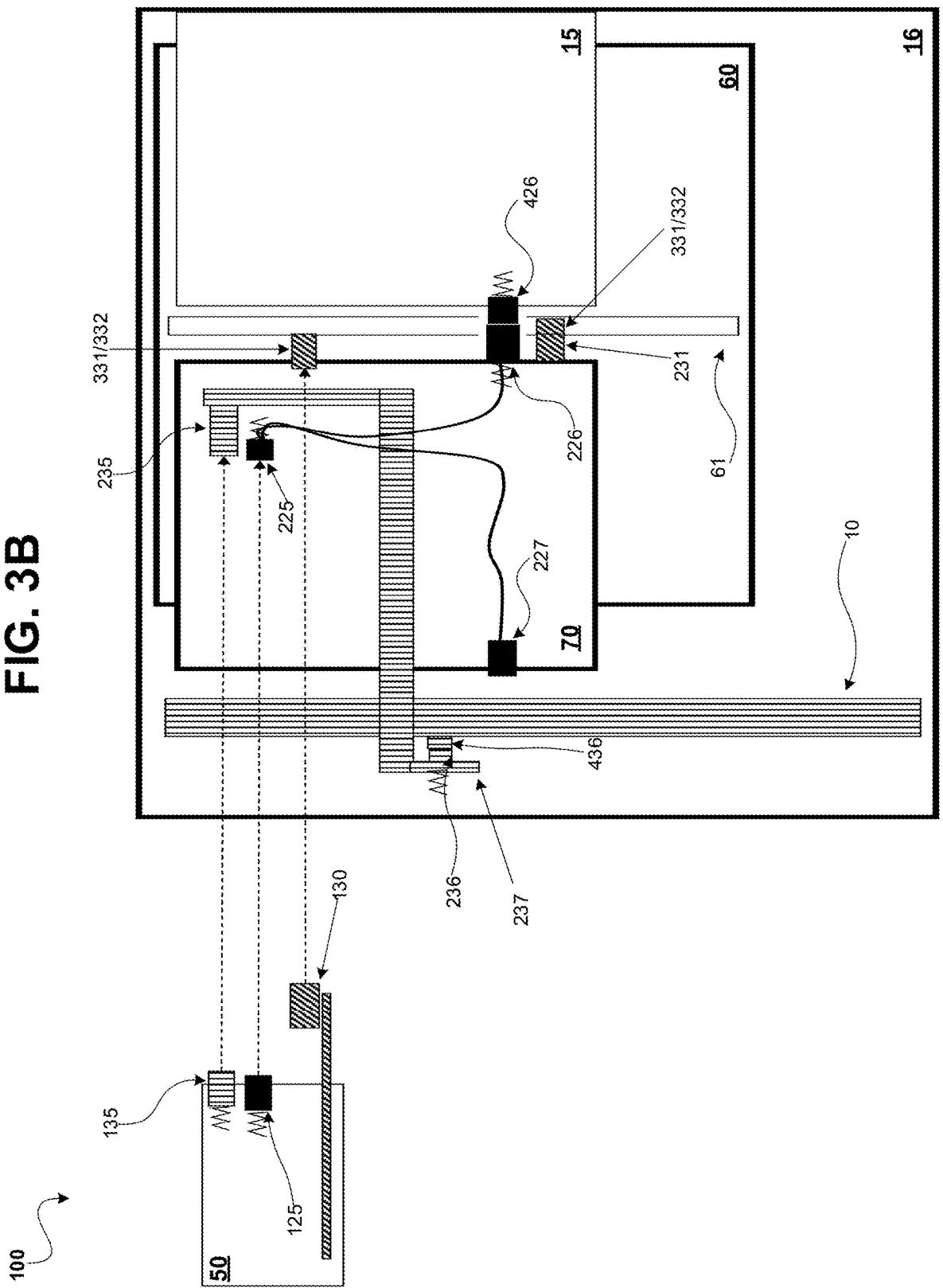

Referring now to FIGS. 3A-3D, the sequence for assembling the nested co-blindmate high-density optical switch system 100 is shown. FIGS. 3A-3A-3C can be generally described as illustrating a side view of the nested co-blindmate high-density optical switch system 100. FIG. 3A shows the switch line-card 50, the switch chassis 70, and system enclosure 50 separated, and initially situated such that the each of the layers in the nested configuration can be assembled. Also shown, are the various liquid (indicated by vertical lined pattern), the optical (indicated by solid fill pattern), and the electrical (indicated by diagonal lined pattern) blindmate connectors that are integrated into the nested co-blindmate high-density optical switch system 100 in order to achieve this nesting sequence. In particular, FIG. 3A shows the switch line-card 50 including: switch line-card optical blindmate connectors 125; switch line-card liquid blindmate connectors 135; and switch line-card electrical blindmate connectors 130. The switch chassis 70 includes: the switch chassis optical blindmate connectors 225 (to switch line-card 50); switch chassis optical blindmate connectors 226 (to blade 15); switch chassis liquid blindmate connectors 235 (to switch line-card 50); faceplate optical connectors 227 (to external optical cables); switch chassis liquid blindmate connectors 236 (to rack liquid line 10); and switch chassis management board electrical power and management connector(s) 231. As seen in FIG. 3A, the rack liquid lines 10 are also installed at the rack 16, having rack line liquid connectors 436. The enclosure midplane 61 includes midplane electrical power and management signal connector 331,332. Also, the blade 15 includes optical blindmate connectors 426. For purposes of brevity, electrical and liquid connections for the blade 15 are not shown. In addition, the co-blindmating sequence discussed in reference to FIG. 1 are not discussed in detail again in reference to FIGS. 3A-3D. It should be understood that for purposes of illustration, the connectors are represented in FIGS. 3A-3C using single box, however one or more connectors may be present in the embodiments.

FIG. 3B illustrates stage 1 and stage 2 in the mating sequence, as discussed above. FIG. 3 can be generally described as nesting the switch chassis 70 inside of system enclosure 60. In the illustrated example, the switch chasses 70 is liquid blindmated to the rack liquid lines 10, as seen by the switch chassis liquid blindmate connectors 236 (connected to switch chassis liquid lines 237) being coupled to the rack line liquid connectors 436. The switch chassis 70 is also shown as optically blindmated to blades 15, as seen by the switch chassis optical connectors 226 being coupled to the blade optical connectors 426 through the midplane 61. In some cases, the switch chassis 70 optically blindmates to the blades 15 after the switch chassis 70 is installed and secured in the system enclosure 60. Additionally, the switch chassis 70 is shown to be electrically blindmated to the enclosure midplane 61, as seen by the midplane electrical power and management signal connectors 331,332 being coupled to the switch chassis management board electrical connector 231.

Figure 7A:
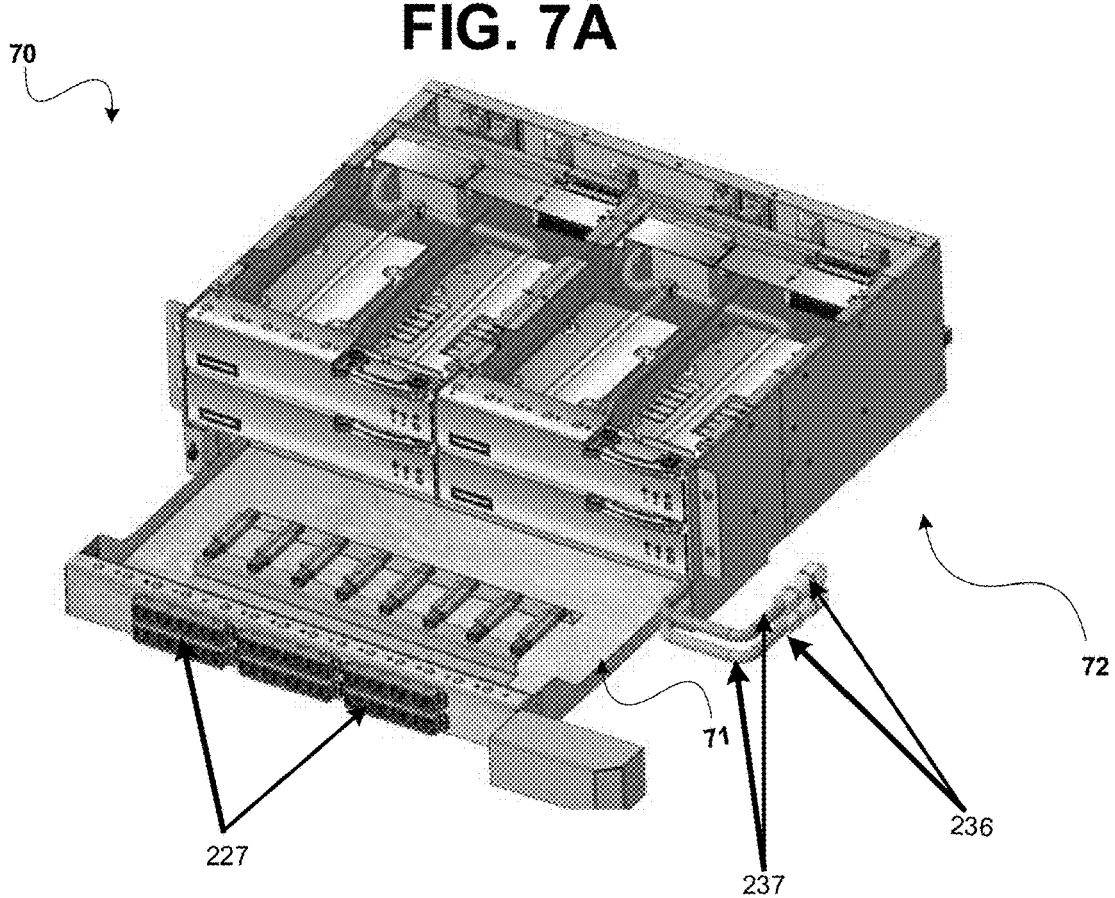
FIGS. 7A-7G are multiple perspective views of an example switch chassis included in the high-density optical switch system shown in FIG. 1, according to some embodiments.
Figure 7B:
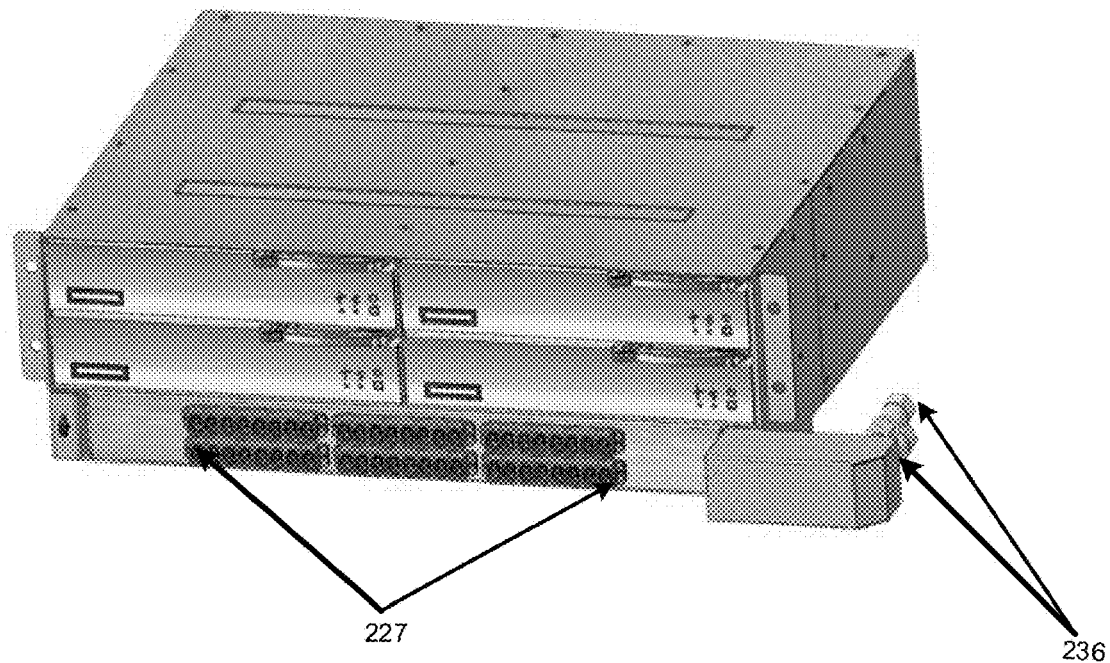
Figure 7C:
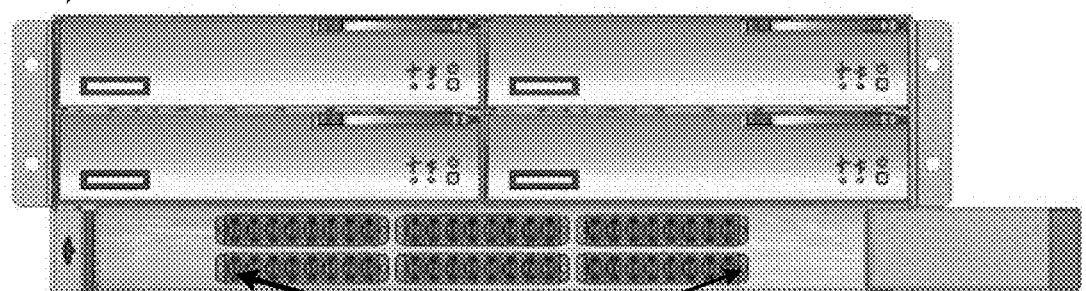
Figure 7D:
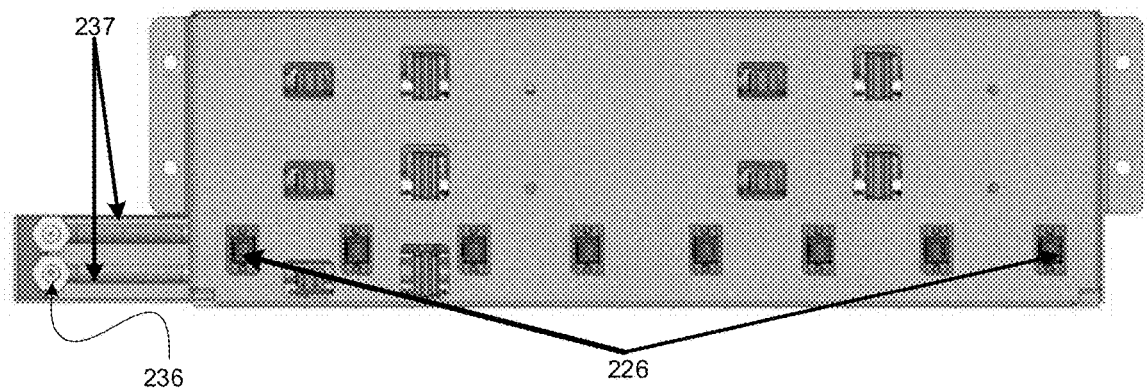
Figure 7E:
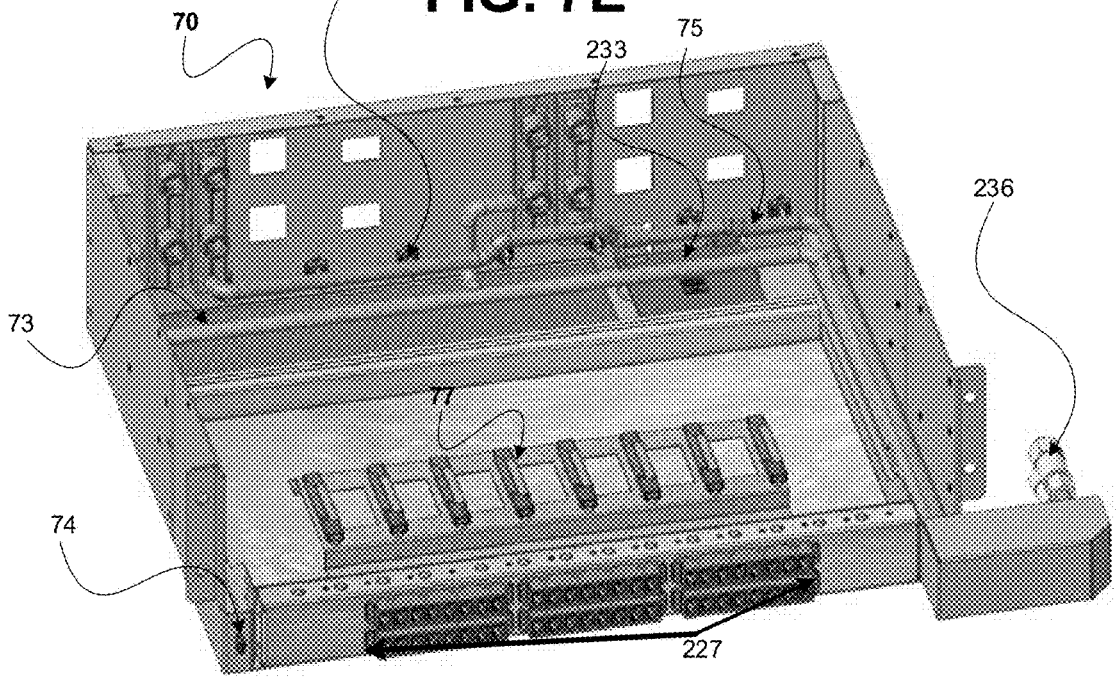

The switch chassis management board is mounted inside of the switch chassis 70 (shown in FIG. 7E).

FIG. 3C illustrates stage 3, stage 4, and stage 5 in the mating sequence, as discussed in detail above. FIG. 3C illustrates the nested configuration that results from modularly installing the switch line-card 50 in the switch chassis 70. In detail, the system 100 forms the nested assembly including the switch line-card 50 within the switch chassis 70, the switch chassis 70 within the system enclosure 60, and the system enclosure 60 within the rack 16. In FIG. 3C, the switch line-card 50 is optically blindmated to the switch chassis 70, as shown by the switch line-card optical blindmate connectors 125 being coupled to switch chassis optical blindmate connectors 225. The optical switch line-card 50 is electrically blindmated to the enclosure midplane 61, as shown by the switch line-card electrical blindmate connectors 130 being coupled to the midplane electrical power and electrical management signal connectors 331,332. Also, the optical switch line-card 50 is liquid blindmated to the switch chassis 70, as shown by the switch line-card liquid blindmate connectors 135 being coupled to the switch chassis liquid blindmate connectors 235. In one example, the mating order may be liquid blindmate, optical blindmate and electrical blindmate where the liquid blindmate connector tolerances may be +/−0.06" in XY (vertical plane) and Z (mating axis) directions, and the optical connector blindmate tolerances may be +/−0.03" in XY (vertical plane) direction and +/−0.02" in the Z (mating axis) direction. In some examples, the electrical blindmate connectors may be fix-mounted on the PCB. In other examples, the electrical blindmate connectors may be float-mounted, e.g., mounted on a sheet metal bulkhead similar to the optical blindmate connector and coupled to the PCB by means of electrical wires. Thus, there can be an embodiment where the electrical blindmate connectors, the optical blindmate connectors, and the liquid blindmate connectors may each be float mounted. In some embodiments, blindmate connectors that are designed for float, are also further designed to have angled "funnels" to ensure that the connectors are mated in proper alignment. It should be appreciated that the mating order described herein is an example, and may vary in alternate embodiments of the nested co-blindmate high-density optical switch system. In some cases, an order of the mating sequence may change is a result of the tolerances of the actual components used in the system. The techniques disclosed herein enable reliable couplings of the liquid-opto-electro blindmate connectors, while not overly burdening design efforts on tolerance stack-ups.

Figure 3D:
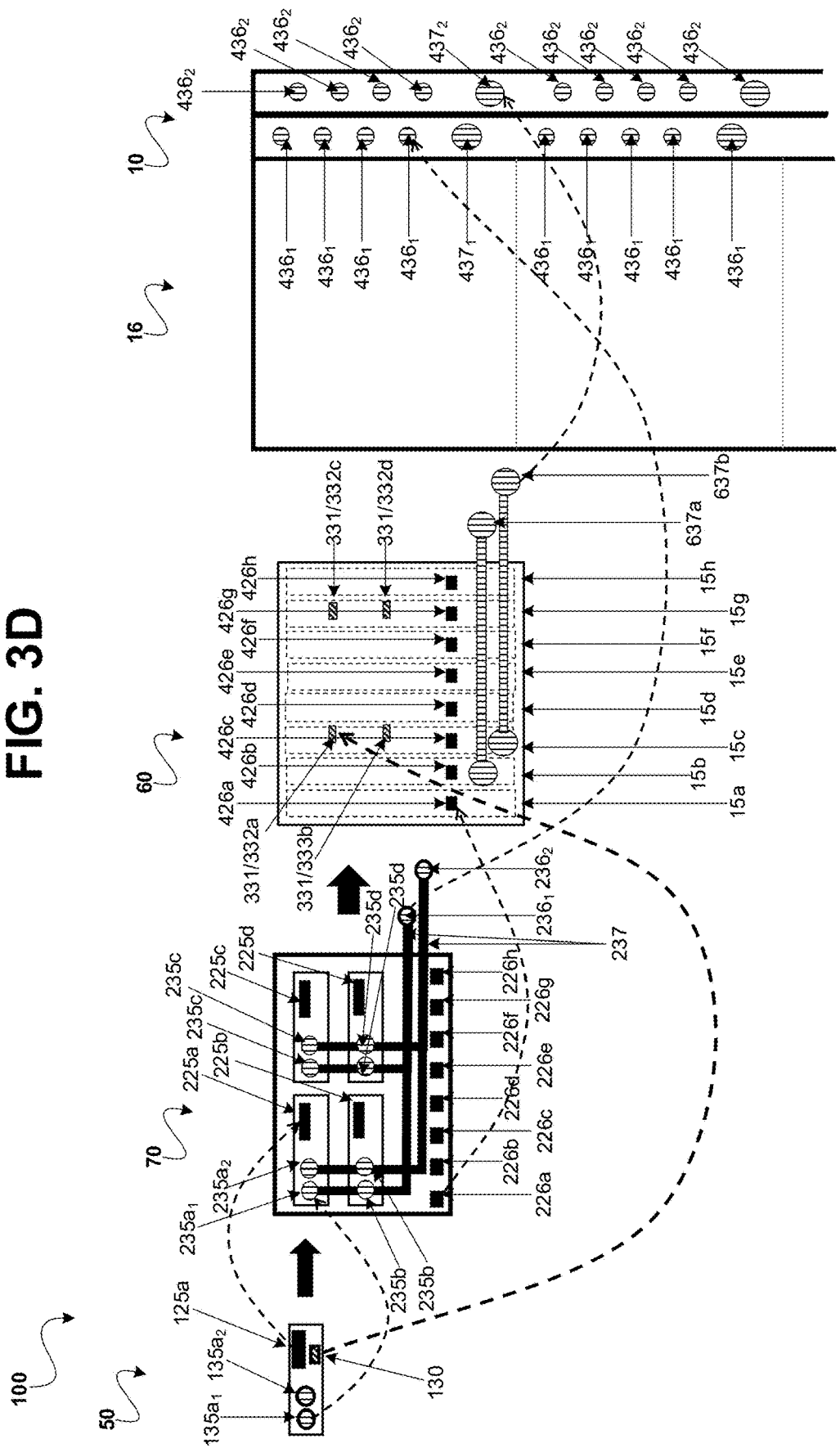

FIG. 3D is another representation of the modular layers of the nested co-blindmate high-density optical switch system 100 disclosed herein. FIG. 3D illustrates the co-blindmating of nested-mating layer connectors (indicated by dashed-line arrows), and the nesting of each nested-mating layer module (indicated by solid arrows). In this example, the switch line-card 50 liquid blindmates to a line-card cage of the switch-chassis 70, and optically blindmates to the line-card cage of the switch chassis 70, when inserted in the switch chassis 70. The switch chassis 70 optically blindmates to blades (indicated by dashed boxes) as it is installed in the system enclosure 60, and liquid blindmates to the rack 16. The system enclosure 60 is also shown to liquid blindmate to rack 16.

Also, in the example of FIG. 3D, the switch chassis 70 is configured with four slots for inserting respective optical switch line-cards 50. FIG. 3D illustrates an example of the optical switch line-card 50 being inserted into a particular slot (e.g., top left). As such, the optical switch line-card 50 including switch line-card optical blindmate connectors 125a and switch line-card liquid blindmate connectors 135$a_1$ (supply fluid),135$a_2$ (return fluid) particularly blindmate to the complimentary connectors on the switch chassis 70 corresponding to that slot, namely switch chassis optical blindmate connectors 225a, and switch chassis liquid blindmate connectors 235$a_1$ (supply fluid),235$a_2$ (return fluid). Furthermore, the optical switch line-card 50 electrically blindmates to the complimentary enclosure midplane electrical connectors 331a,332a, as a nested component inside of the switch chassis 70. It should be appreciated that additional optical switch line-cards (not shown) which may be installed into the remaining slots of the switch chassis 70, would also couple their respective blindmate connectors to the complimentary connectors of the switch chassis 70 and the system enclosure 60 in a manner similar to the blindmating described above. For example, a second optical switch line-card could optically blindmate to switch chassis optical blindmate connectors 225b, liquid blindmate to switch chassis liquid blindmate connectors 235$b_1$ (supply fluid),235$b_2$ (return fluid), and electrically blindmate to enclosure midplane electrical connectors 331b,332b. A third optical switch line-card can optically blindmate to switch chassis optical blindmate connectors 225c, liquid blindmate to switch chassis liquid blindmate connectors 235$c_1$ (supply fluid),235$c_2$ (return fluid), and electrically blindmate to enclosure midplane electrical connectors 331c,332c. Lastly, a fourth optical switch line-card can optically blindmate to switch chassis optical blindmate connectors 225d, liquid blindmate to switch chassis liquid blindmate connectors 235$d_1$ (supply fluid),235$d_2$ (return fluid), and electrically blindmate to enclosure midplane electrical connectors 331d, 332d.

Also, in the example of FIG. 3D, the system enclosure 60 is shown to house eight blades 15a-15h. Accordingly, the switch chassis 70 is configured with eight switch chassis optical blindmate connectors 226a-226h. Each of the switch chassis optical blindmate connectors 226a-226h can couple to the complimentary blade optical blindmate connectors 426a-426h. As an example, optically blindmating the switch chassis 70 by connecting the optical switch chassis optical blindmate connector 226a to blade optical blindmate connector 426a, would optically couple the switch chassis 70 to the blade 15a.

Moreover, the switch chassis 70 can be liquid blindmated to rack liquid lines 10 in the rack 16, by coupling the switch chassis liquid blindmate connectors 236$_1$ (supply fluid), 236$_2$ (return fluid) to complimentary rack liquid line connectors 436$_1$ (supply fluid), 436$_2$ (return fluid). In some example embodiments, the system enclosure 60 can power blindmate (not shown), and liquid blindmate to the rack 16. For example, FIG. 3D illustrates system enclosure 60 having liquid blindmate connectors 637$_1$ (supply fluid), and liquid blindmate connectors 637$_2$ (return fluid) that can couple to complimentary rack liquid line connectors 437$_1$ (supply fluid), 437$_2$ (return fluid) of the rack liquid lines 10.

Figure 4:
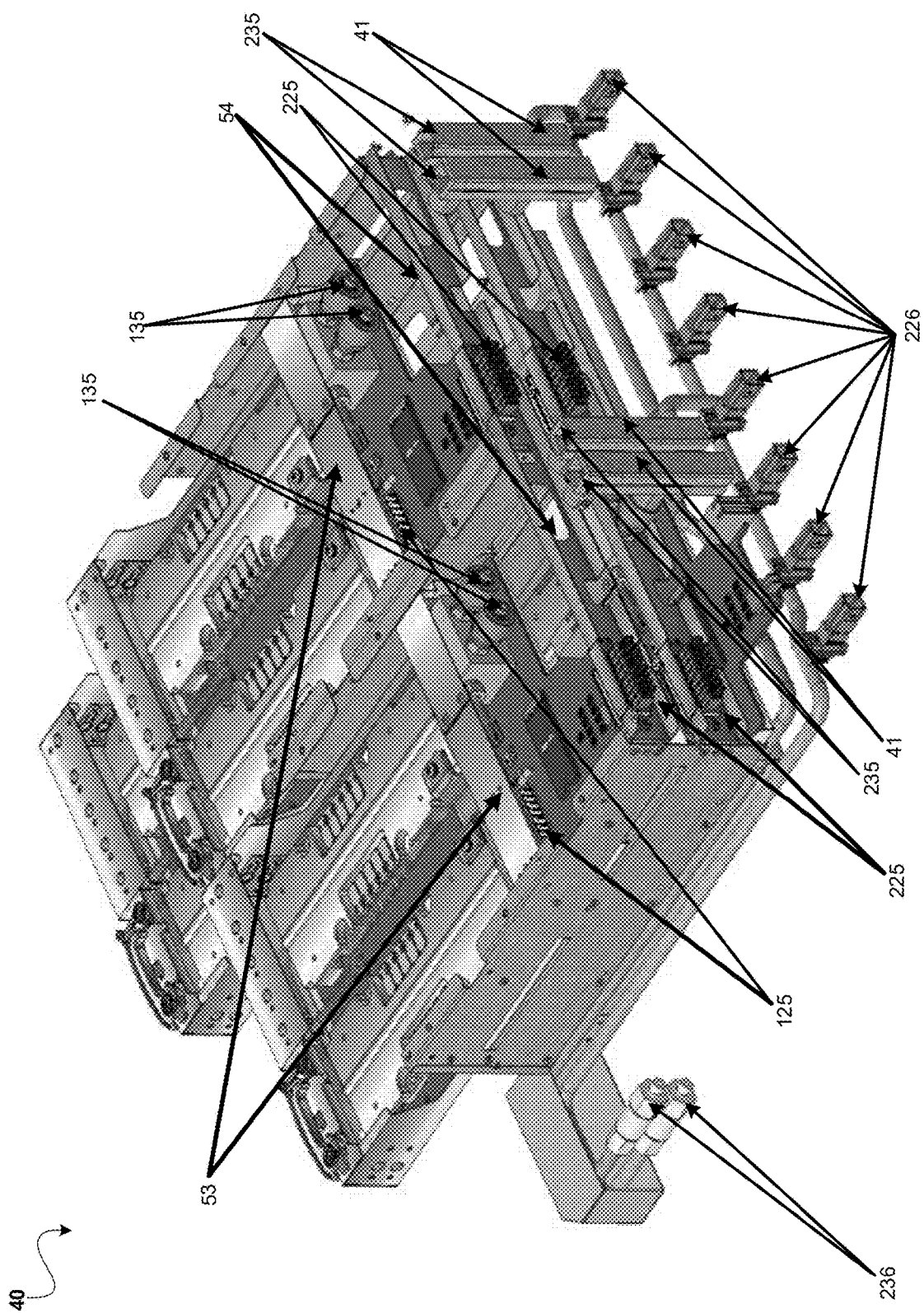
FIG. 4 is a diagram of an example optical switch included in the high-density optical switch system shown in FIG. 1, according to some embodiments.

FIG. 4 is a perspective view illustrating the optical switch 40 in greater detail. Referring to FIG. 4, it should be appreciated that an optical switch 40 of the embodiments is an assembly formed by installing one or more optical switch line-cards 50 into a switch chassis 70. For purposes of brevity, elements of the optical switch 40 that are similar components of the optical switch line-card 50 (shown in FIGS. 5A-5C), and the switch chassis 70 (shown in FIGS. 7A-7G) are not discussed in detail in reference to FIG. 4.

Figure 5A:
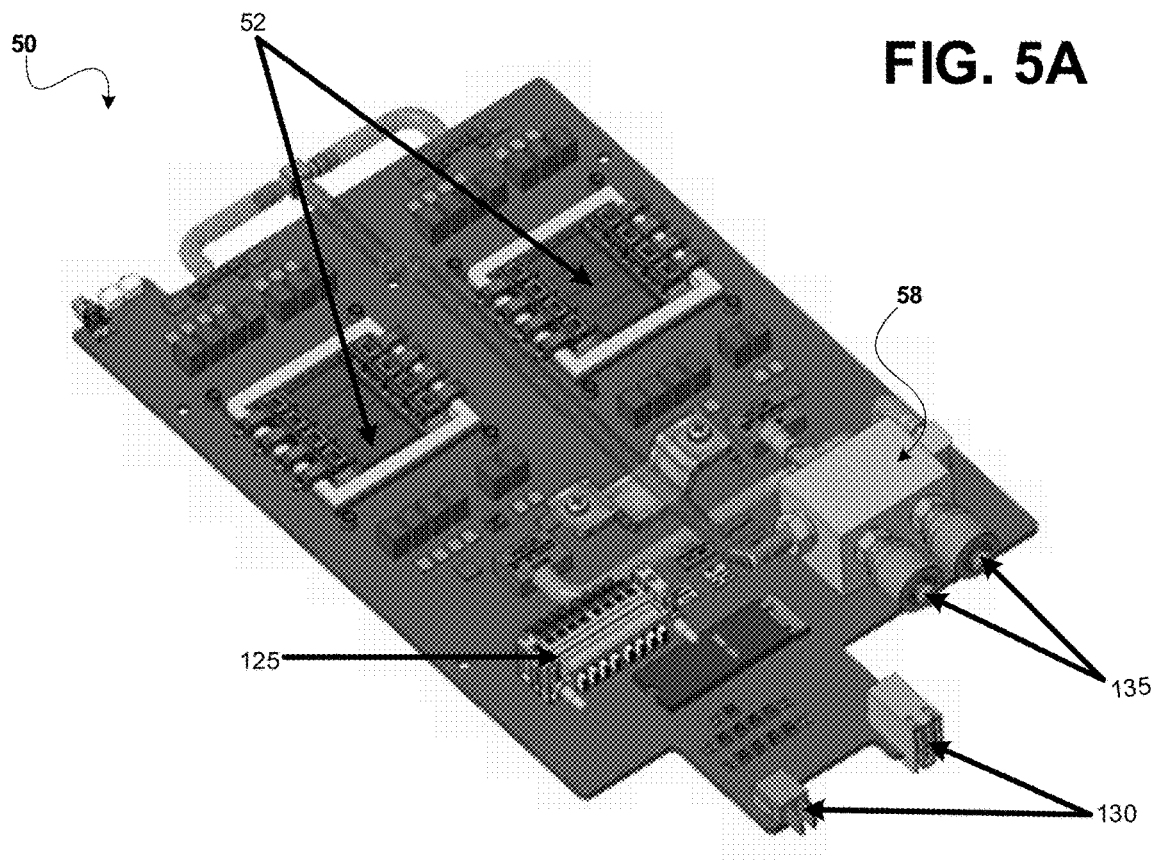
FIGS. 5A-5C are multiple perspective views of an example optical switch line-card included in the high-density optical switch system shown in FIG. 1, according to some embodiments.
Figure 5B:
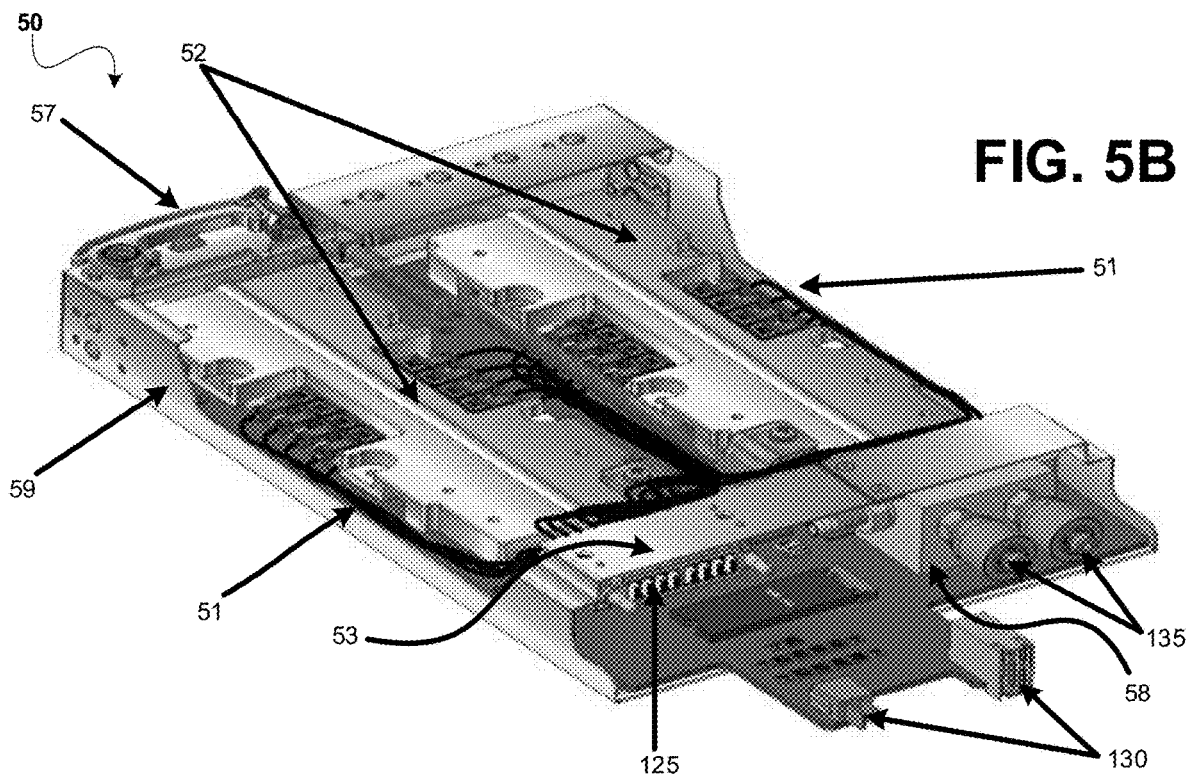
Figure 5C:
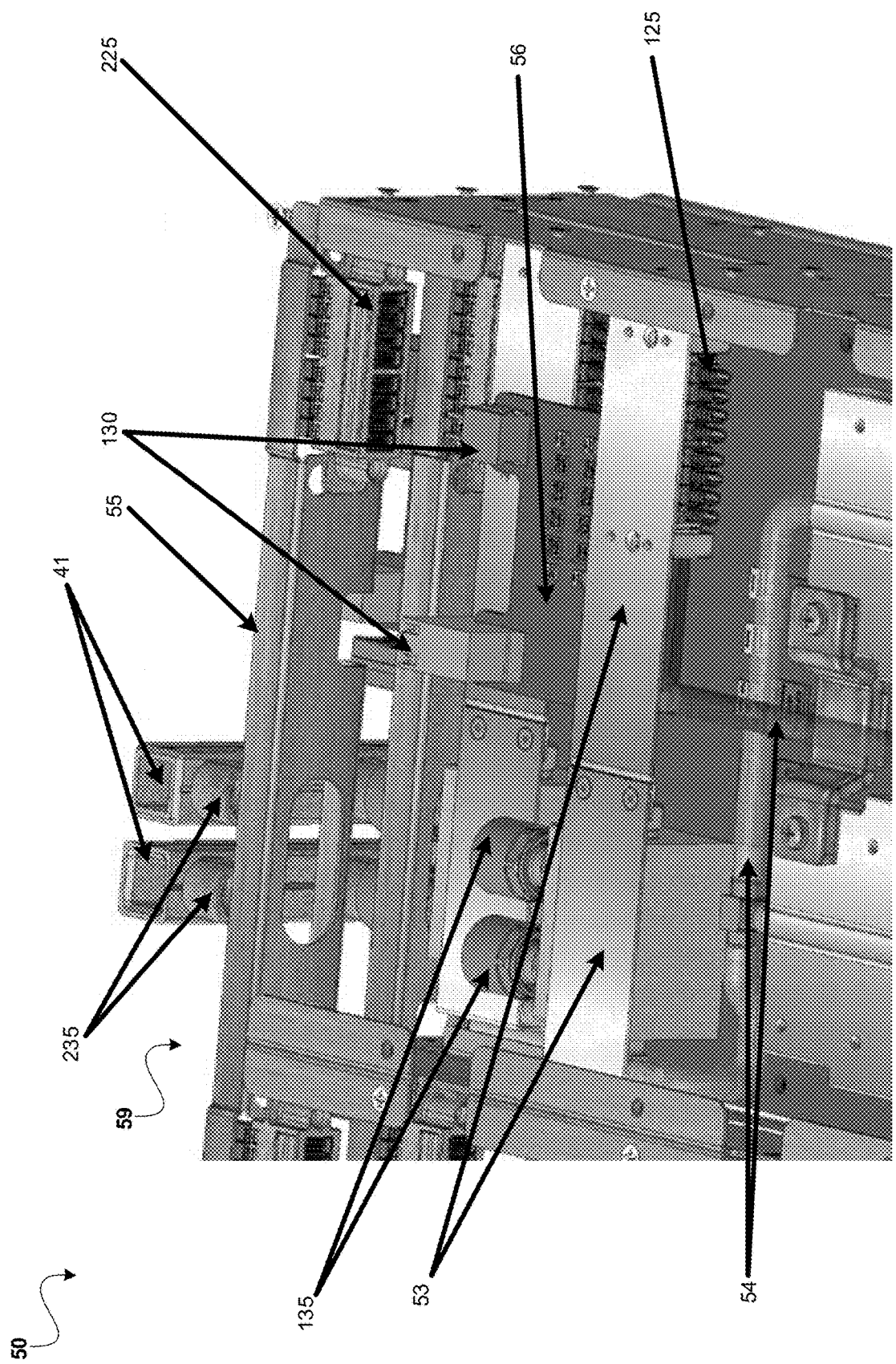

FIGS. 5A-5C illustrate multiple perspective views, which prominently show the configuration of the optical switch line-card 50 in greater detail. In FIG. 5A, the optical switch line-card 50 is illustrated as having switch line-card optical blindmate connectors 125 mounted thereto on the underside of a mechanical bracket (not shown in FIG. 5A but shown in FIG. 5B). Furthermore, there are switch line-card electrical blindmate connectors 130, and switch line-card liquid blindmate connectors 135 affixed to the optical switch line-card 50. There can be two switch line-card liquid blindmate connectors 135 so as to correspondingly provide connections to a supply liquid line, and a return liquid line that may be present in the cooling system. The pair of switch line-card liquid blindmate connector 135 are also connected to a water block 58. The water block 58 is configured to have floating (e.g., flexible movement) aspects that assist in mating the optical switch line-card 50. As an example, the water block 58 can be constructed to include springs on its bottom surface (e.g., surface facing the optical switch line-card 50), supporting float along the line-card-z-direction (with respect to the front surface of the optical switch line-card 50), or the mating axis. It should be understood that float of the water block 58 is not limited to z-float, and the water block 58 is structured such that floating movement can be in other directions (e.g., line-card-x-direction, line-card-y-direction). In the case where force is applied to blindmate the switch line-card liquid blindmate connectors 135 with switch chassis liquid blindmate connectors 235 of the switch chassis 70 (shown in FIG. 7A), the optical switch line-card 50 is allowed to continue its movement along the mating axis due to the float of the water block 58. Thus, even after the switch line-card liquid blindmate connectors 135 are mated, movement of the optical switch line-card 50 is not completely restricted, allowing it to reach the switch chassis optical blindmate connector 225 to co-blindmate the switch line-card optical blindmate connector 125, and then the enclosure midplane (located in the rear of the enclosure) to co-blindmate the switch line-card electrical blindmate connectors 130 with the enclosure midplane. FIG. 5A also illustrates that the individual electrical blindmate connectors 130 are different from each other, having different contact wipes. The electrical blindmate connectors 130 can be fixed-mounted on the printed circuit board (PCB) of the optical switch line-card 50.

FIG. 5B shows the optical switch line-card 50 that is configured for nesting and co-blindmating in accordance with the nested co-blindmate high-density optical switch system 100. The optical switch line-card 50 can include optically co-packaged switch ASICs 52. In the example, the switch ASICs 52 are thermally coupled to cold plates (shown in FIG. 3B). Some optically co-packaged switch ASICs are implemented in systems that can provide scalable bandwidth fabric, low latency, and scalable fabric size. With the use of optically co-packages ASICs, for instance, the optical signals may be coupled directly to the switch ASIC packages, which requires some modularity in the optical connectors (shown attached to the switch ASIC packages). As an example, shown in FIG. 5B, the optically co-packaged ASICs 52 can have optical jumper fibers 51 modularly attached, thereby serving as optical connection links for fabric ports. The optical jumper fibers 51 couples to chip ferrules on one side and a connector ferrule on the other side that is installed in the optical blindmate connector 125. The optical blindmate connector 125 is mounted on the underside of the line-card brace bracket 53 that allows the optical connector to float. Also, FIG. 5B can be generally described as showing the optical switch line-card 50 inside of it dedicated mounting structure, or line-card cage 59.

FIG. 5C is another perspective view of a portion of the optical switch line-card 50. As seen in FIG. 5C, the switch line-card optical blindmate connectors 125 can be floated under the line-card brace bracket 53. The switch chassis optical blindmate connectors 225 are located on the line-card cage 59, however, are floated on a line-card cage bracket 55. Also, in the illustrated example, switch line card liquid blindmate connectors 235 that are attached to the line-card cage 59, are fixed-mounted on line-cage water blocks 41.

An optical connector 225 on the cage side can have an opening, or clearance. The switch line-card electrical blindmate connectors 130 that extend outward from the optical switch line-card 50, can pass through this clearance, as the optical switch line-card 50 move along the line-card-z axis during blindmating. The switch line-card optical blindmate connectors 125 can mate with the complimentary connectors 225 of the switch chassis (shown in FIG. 7A), as the switch line-card electrical blindmate connectors 130 progress through the clearance under the switch chassis optical blindmate connector 225. The optical switch line-card 50 is allowed to continue its movement along the line-card-z direction due to the float of the optical blindmate connector pair 125 and 225. Thus, even after the switch line-card optical blindmate connectors 125 are mated with the switch chassis optical blindmate connector 225, the optical switch line-card 50 can be pushed further along the line-card-z direction, allowing the switch line-card electrical blindmate connectors 130 to electrically co-blindmate with the enclosure midplane blindmate electrical connectors 331,332. In some cases, the liquid blindmate connectors, switch line-card liquid blindmate connectors 135 and switch chassis liquid blindmate connectors 235, may be blindmated before the optical blindmate connectors, switch line-card optical blindmate connectors 125 and switch chassis optical blindmate connectors 225, are blindmated as described above. In other cases, the optical blindmate connectors, switch line-card optical blindmate connectors 125 and switch chassis optical blindmate connectors 225, may be blindmated before the liquid blindmate connectors, switch line-card liquid blindmate connectors 135 and switch chassis liquid blindmate connectors 235, are blindmated. Regardless, the switch line-card electrical blindmate connectors 130 and enclosure midplane blindmate electrical connectors 331,332 are blindmated last in the co-blindmate sequence.

The switch line-card optical blindmate connectors 125 can include optical ferrules to mount and align the end-faces of the individual optical fibers held therein. According to some embodiments, optical ferrules also have float (e.g., line-card-x direction, line-card-y direction, and line-card-z direction), which can improve optical fiber coupling performance. Consequently, the unique design of the optical switch line-card 50 supports the features that are distinct to the nested co-blindmate high-density switch system, namely integrating liquid, electrical, and optical connections. Moreover, the floating aspects can provide a reliable blindmating of the respective switch line-card optical blindmate connectors 125, switch line-card liquid blindmate connectors 135, and switch line-card electrical blindmate connectors 130, concluded by securing the switch line-card 50 at the faceplate of the optical switch line-card 50 by means of the line-card latching lever 57 as shown in FIG. 5B.

Figure 6:
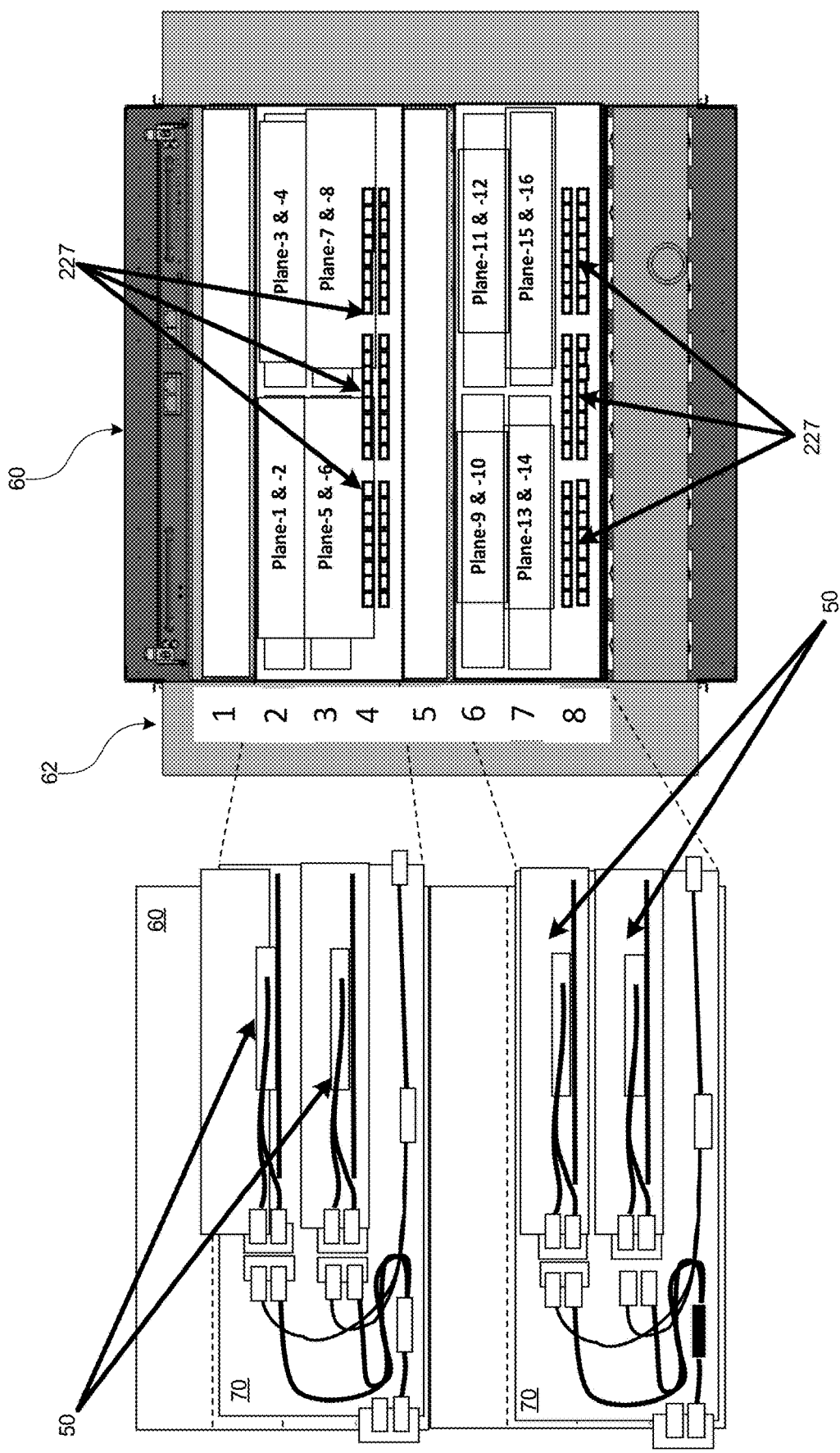
FIG. 6 is a diagram of an example system enclosure included in the high-density optical switch system shown in FIG. 1, according to some embodiments.

Referring now to FIG. 6, a diagram shows the system enclosure 60 in greater detail. As seen in FIG. 6, the system enclosure 60 can include multiple rear bays 62, where a switch chassis 70 can be installed. As alluded to above, in accordance with the nested aspects, switch chassis 70 can have optical-switch line-cards 50 installed therein. Thus, multiple optical-switch line-cards 50 also reside in the system enclosure 60. For purposes of illustration, FIG. 6 shows four hot-serviceable optical switch line-cards 50 in each switch chassis 70. Accordingly, an optical switch line-card 50 can be serviced (e.g., added, removed, or replace) independently without disconnecting the power supply of the switch chassis 70 from the system enclosure 60. It should be appreciated that in some embodiments, the system enclosure 60 provides a power supply to all of the enclosed components.

Even further, the illustrated example shows two switch chasses 70 housed inside the system enclosure 60. As such, the system enclosure 60 contains multiple optical connectors 227 mounted to the switch chassis 70 for receiving inter-switch links, such as external optical cables. The optical connectors 227 can be implemented as any optical connector deemed appropriate for optical coupling of optical switches, such as faceplate optical connectors. It should be appreciated that although a two-switch-chasses 70 configuration is described for the purposes of illustrating the nested co-blindmate high-density optical switch system 100, other configurations (having varying numbers of rear bays 62, switch optical-line-cards 50, optical connectors 63, etc.) can be used in other embodiments.

Figure 7F:
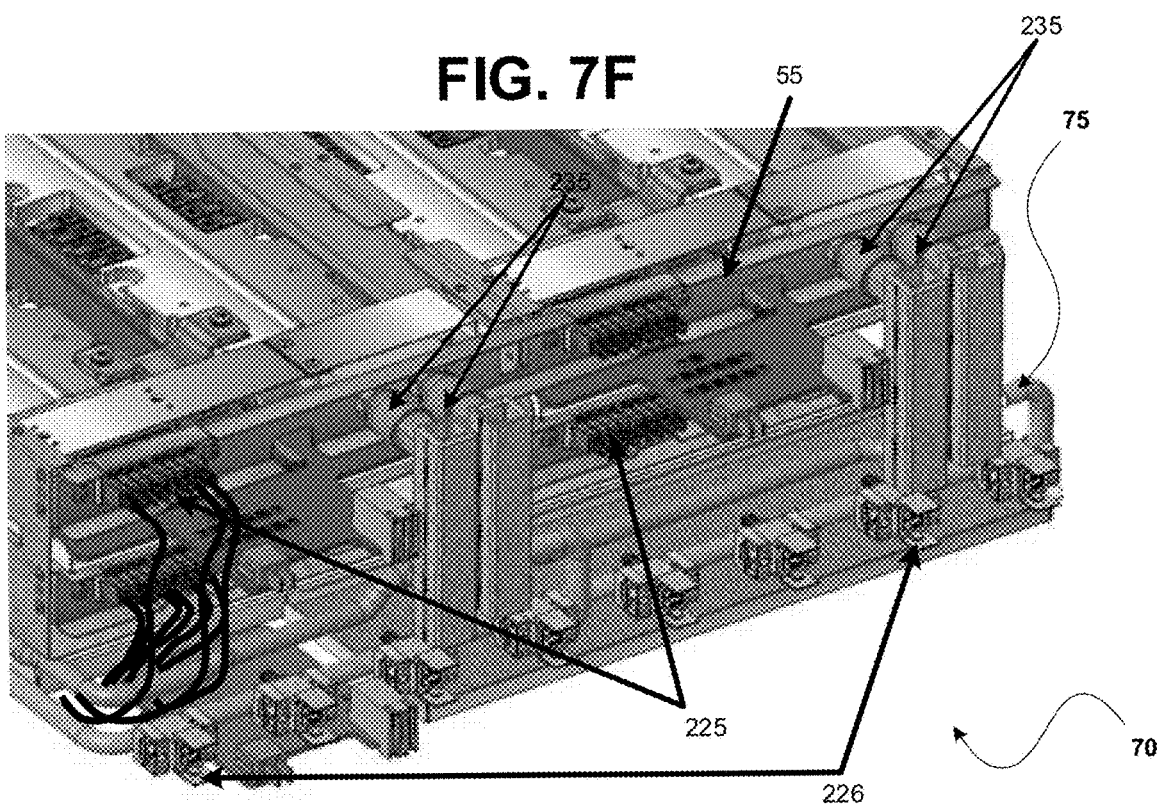
Figure 7G:
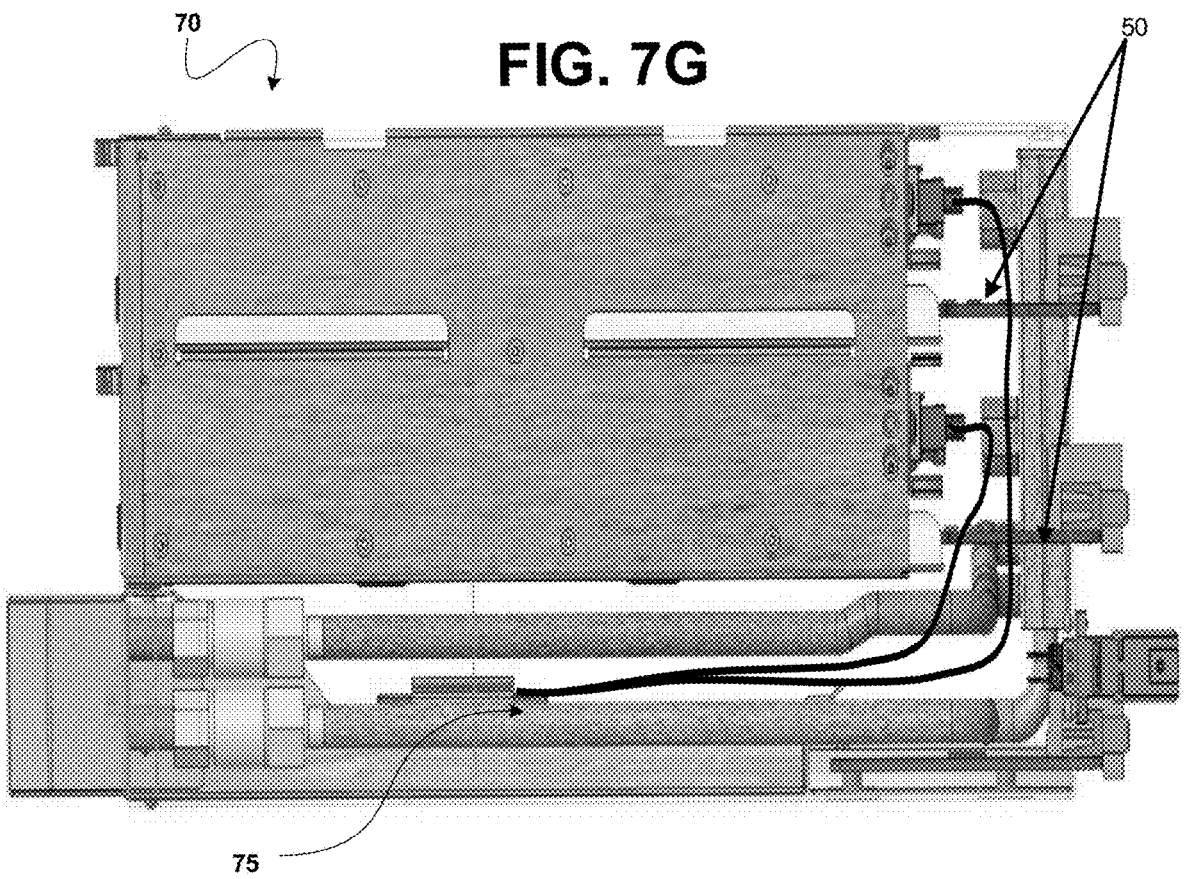

FIGS. 7A-7E are multiple perspective views illustrating the switch chassis 70 in greater detail. FIG. 7C is a rear-facing view of the switch chassis 70 illustrating the faceplate optical connectors 227. Alternatively, FIG. 7D is a front-facing view of the switch chassis 70 illustrating the switch chassis optical blindmate connectors 226 (to blades) and switch chassis liquid blindmate connectors 236 (to rack). FIG. 7G illustrates a side view of the switch chassis 70, with optical switch line-cards 50 installed.

Referring now to FIG. 7A, the switch chassis 70 is shown to include multiple components. For instance, a shuffle tray 71 is shown open in FIG. 7A. In contrast, FIG. 7B shows a perspective view with the shuffle tray 71 closed. The switch chassis 70 is also shown to include switch chassis liquid blindmate connectors 236 (to rack liquid lines), which can be configured for quick connection to (and disconnection from) the rack liquid lines without leakage, as described in detail above. Excessive heat can affect the performance, availability and lifespan of equipment. Thus, the nested co-blindmate optical high-density system incorporates cooling method that provides a solution that is effective considering the equipment densities. For example, a pair of liquid lines 75 can travel through the switch chassis 70, as seen in FIGS. 7E-7G, usable to cool the components installed therein. Furthermore, FIG. 7E shows additional components of the switch chassis 70, including but not limited to: fiber shuffle assemblies 77; switch chassis management board 233; liquid absorbent mat 73; leak detection connector for rack-level manager 74; and faceplate optical blindmate connectors 227.

FIG. 7F illustrates components that contribute to the unique configuration of the switch chassis 70 (e.g., enabling by liquid-opto-electro co-blindmate) in accordance with the embodiments, including switch chassis liquid blindmate connectors 235 (to switch line-card), switch chassis optical blindmate connectors 226 (to blades), switch chassis optical blindmate connectors 225 (to line switch line-cards). FIG. 7F illustrates that switch chassis optical blindmate connectors 225 are floated on a line-card cage bracket 55. Also seen in FIG. 7F are switch chassis optical blindmate connectors 226 (to blades), which can be floated on a cage bulkhead. Accordingly, the switch chassis 70 enables the nested co-blindmate high-density optical switch system to implement the cooling and optical connectivity features disclosed herein.

Figure 7H:
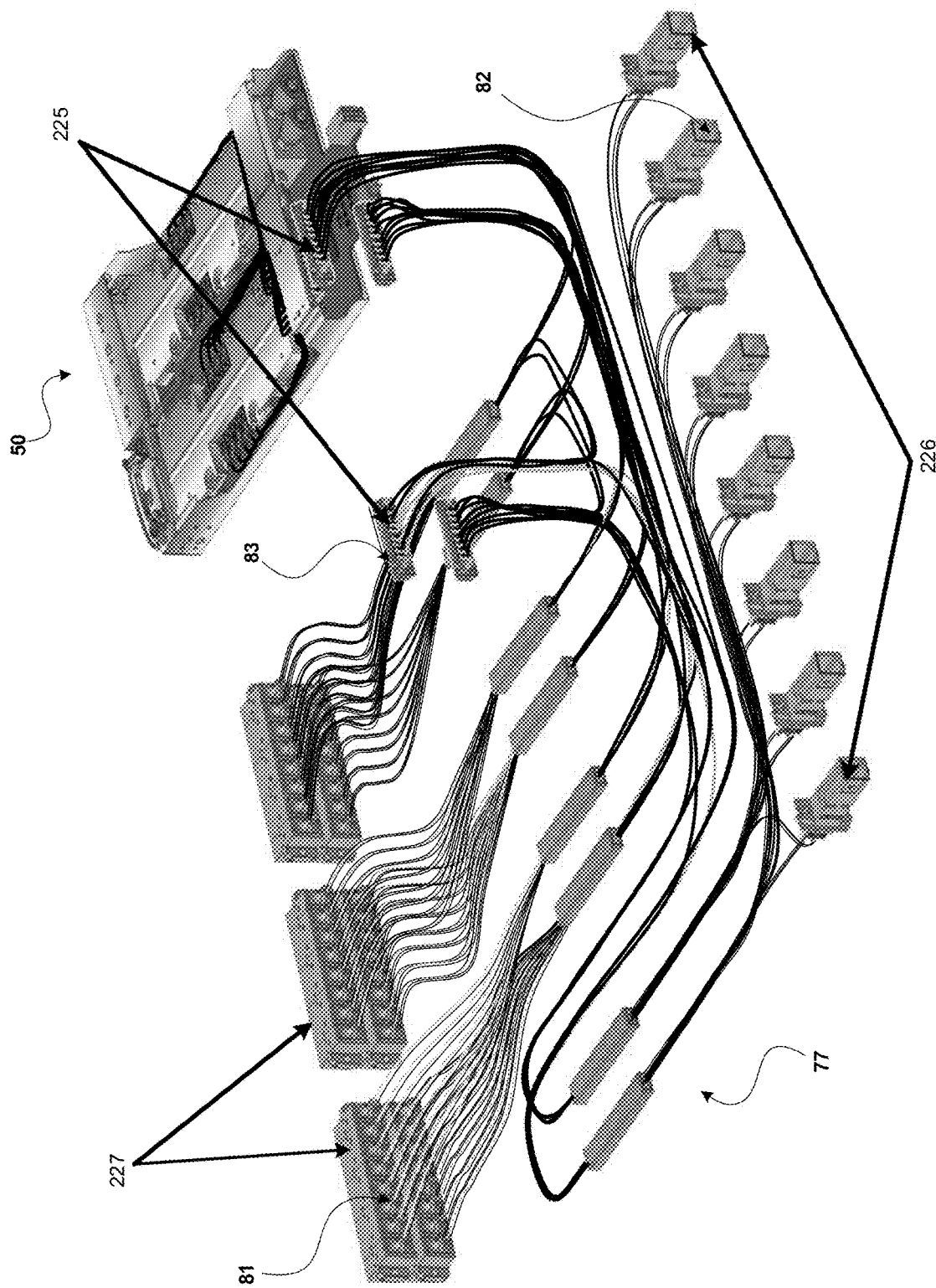
FIG. 7H is an example of fiber shuffles implemented using the optical switch line-card shown in FIGS. 5A-5C, according to some embodiments.

Now, in reference to FIG. 7H, an example of fiber shuffles implemented using the optical switch line-card 50 is shown. Fiber shuffles can fan-out each faceplate connector ferrule 81, and each optical connector ferrule 82, in order to provide an inter-switch link (ISL) connector to optically couple to multiple switch line-cards. An ISL can couple faceplate connector ferrules 81 from the faceplate optical connectors 227, and optical ferrules 82 of switch chassis optical blindmate connectors 226 (to blades), with the optical ferrules 83 of switch chassis optical blindmate connectors 225 (to switch line-cards). For instance, a 16 fibers from an inter-switch link connector can be a fan-out to switch chips on multiple optical switch line-cards 50, via the fiber shuffles 77. This example serves to illustrate an advantage realized by the nested co-blindmate high-density optical switch system disclosed here. An optical switch, for example up to eight switches (by using hot-serviceable four line-cards with two switches per line-card), for some fabric topologies can be contained in one switch chassis, according to the embodiments. This allows the fabric shuffle to internally connect fibers from one inter-switch links (ISL) cable to eight switches and/or eight blades, reducing the external cable connection complexity. In addition, fibers from the optical blindmate connectors 226 may be fanned out to faceplate connectors 227 and/or switch chassis optical blindmate connectors 225. Furthermore, fibers from ferrules 83 of switch chassis optical blindmate connectors 225 may be interconnected via the fiber shuffles 77. Therefore, fiber shuffles 77 can provide complex connectivity among the ferrules 81 of faceplate optical connectors 227, ferrules 82 of optical blindmate connectors 226, and ferrules 83 of switch chassis optical connectors 225, without exposing the connection complexity to outside of the switch chassis 70. In contrast, without the switch chip density enabled by the nested co-blindmate high-density optical switch system, eight individual switch boxes, each containing a switch chip with multiple faceplate connectors, need to be interconnected with external optical cables to provide connectivity to the ports of the eight switches. Therefore, the nested co-blindmate high-density optical switch systems can result in significantly reduced connection complexity that can lead to lower costs fiber assemblies, and faster deployment.

Moreover, the nested configuration, of the nested co-blind mate optical switch system provides a compact and aesthetically clean cable plant design. In referring back to FIG. 1, the system 100 is configured such that no liquid lines are visible, no intra-system cables are visible, and employing a minimal number of ISL cables and connectors. The modularity of the design allows scalability of the number of optical switches implemented in the system. The nested-mating layers supports ease-of-use and scalability by allowing hot-plug/unplug of optical switch line-cards, as alluded to above (enabled by liquid-opto-electro co-blindmates).

As used herein, a system might be implemented utilizing any form of hardware, software, or a combination thereof. For example, one or more processors, controllers, ASICs, PLAs, PALs, CPLDs, FPGAs, logical components, software routines or other mechanisms might be implemented to make up a system. In implementation, the various systems described herein might be implemented as discrete systems or the functions and features described can be shared in part or in total among one or more systems. Even though various features or elements of functionality may be individually described or claimed as separate systems, these features and functionality can be shared among one or more common systems, and such description shall not require or imply that separate systems are required to implement such features or functionality. Where a system is implemented in whole or in part using software, such software can be implemented to operate with a computing or processing system capable of carrying out the functionality described with respect thereto.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical switch system, comprising:
   a system enclosure;
   an enclosure midplane enclosed by the enclosure;
   a switch chassis enclosed by the system enclosure, wherein the switch chassis:
     liquid blindmates to a liquid line on a rack;
     optically blindmates to at least one blade; and
     electrically blindmates to the enclosure midplane; and
   at least one optical switch line-card enclosed by the switch chassis, wherein the at least one optical switch line-card:
     liquid blindmates to the switch chassis;
     optically blindmates to the switch chassis, and
     electrically blindmates to the enclosure midplane.

2. The optical switch system of claim 1, wherein the enclosure midplane comprises electrical power connections and electrical management signal connections that couple to the at least one optical switch during the electrical blindmate to the enclosure midplane, and couple to the switch chassis during the electrical blindmate to the enclosure midplane.

3. The optical switch system of claim 2, wherein the switch chassis optically blindmates to the at least one blade through the enclosure midplane.

4. The optical switch system of claim 1, comprising line-card optical blindmate connectors optically blindmating the at least one switch line-card to the switch chassis.

5. The optical switch system of claim 4, comprising a housing retaining the line-card optical blindmate connectors and absorbing movement to support mechanical float of the optical blindmate connectors.

6. The optical system of claim 5, wherein the mechanical float supports continued movement of the at least one optical switch line-card along a blindmating axis to allow for electrically blindmating to the enclosure midplane.

7. The optical system of claim 4, comprising line-card electrical blindmate connectors mounted to a line-card printed circuit board (PCB), and electrically blindmating the at least one optical switch line-card to the enclosure midplane.

8. The optical system of claim 4, comprising a water block coupled to liquid blindmate connectors for liquid blindmating the at least one switch line-card to the switch chassis, and the water block absorbing movement to support mechanical float of the water block during blindmating.

9. A method, comprising:
   optically blindmating switch chassis optical blindmate connectors to at least one blade in a system enclosure, wherein the switch chassis optical blindmate connectors are mounted to a switch chassis;
   electrically blindmating electrical connectors of the switch chassis to electrical connectors of an enclosure midplane, wherein the electrical connectors of the switch chassis are mounted to a switch chassis management board;
   liquid blindmating switch chassis liquid blindmate connectors to a rack liquid line, wherein the switch chassis liquid blindmate connectors are mounted to the switch chassis; and
   nested blindmating at least one optical switch line-card to the switch chassis.

* * * * *